(12) United States Patent
Liu et al.

(10) Patent No.: US 12,207,141 B2
(45) Date of Patent: Jan. 21, 2025

(54) NETWORK CODING HANDOVER BETWEEN NETWORK CODING DEVICES

(71) Applicant: QUALCOMM Incorporated, San Diego, CA (US)

(72) Inventors: Guangyi Liu, San Diego, CA (US); Shuanshuan Wu, San Diego, CA (US); Gabi Sarkis, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/858,918

(22) Filed: Jul. 6, 2022

(65) Prior Publication Data

US 2024/0015600 A1    Jan. 11, 2024

(51) Int. Cl.
*H04L 1/1607* (2023.01)
*H04L 1/18* (2023.01)
*H04W 36/00* (2009.01)

(52) U.S. Cl.
CPC ....... *H04W 36/0011* (2013.01); *H04L 1/1607* (2013.01); *H04L 1/18* (2013.01)

(58) Field of Classification Search
None
See application file for complete search history.

(56) References Cited

U.S. PATENT DOCUMENTS

| 9,402,209 | B1 | 7/2016 | Vivanco et al. |
| 2008/0137585 | A1* | 6/2008 | Loyola ................ H04L 1/06 370/315 |
| 2009/0175214 | A1* | 7/2009 | Sfar ................ H04J 11/0053 370/315 |
| 2011/0116483 | A1* | 5/2011 | Lee ................ H04L 1/1887 370/338 |
| 2015/0334209 | A1 | 11/2015 | Song |
| 2017/0302500 | A1* | 10/2017 | Lu ................ H04L 65/00 |

(Continued)

FOREIGN PATENT DOCUMENTS

| EP | 3007379 A1 | 4/2016 |
| EP | 2594031 B1 | 9/2017 |
| WO | WO-2009075509 A2 | 6/2009 |

OTHER PUBLICATIONS

International Search Report and Written Opinion—PCT/US2023/068087—ISA/EPO—Sep. 7, 2023.

(Continued)

*Primary Examiner* — Benjamin Lamont
(74) *Attorney, Agent, or Firm* — Holland & Hart LLP

(57) ABSTRACT

Methods, systems, and devices for wireless communications are described. A first network coding device may determine to hand over retransmission of a packet (e.g., the task of retransmitting the packet) to a second network coding device, and the first network coding device may use the techniques described herein to perform the handover. In one aspect, the first network coding device may transmit a negative acknowledgment (NACK) to a user equipment (UE) that originally transmitted the packet, and the UE may transmit a request for any of one or more network coding devices to take over retransmission of the packet. In another aspect, the first network coding device may transmit a request for any of one or more network coding devices to take over retransmission of the packet.

24 Claims, 17 Drawing Sheets

(56) References Cited

U.S. PATENT DOCUMENTS

| | | | |
|---|---|---|---|
| 2018/0351907 A1* | 12/2018 | Ryu | H04L 61/5046 |
| 2020/0351028 A1* | 11/2020 | Wang | H04L 5/0055 |
| 2021/0083804 A1* | 3/2021 | Zhou | H04L 1/1887 |
| 2021/0083832 A1* | 3/2021 | Zhou | H04W 72/23 |
| 2021/0194645 A1* | 6/2021 | Li | H04L 1/1845 |
| 2022/0021491 A1 | 1/2022 | Zhou et al. | |
| 2023/0300907 A1* | 9/2023 | Kalhan | H04W 40/248 |
| | | | 370/329 |

OTHER PUBLICATIONS

Qualcomm: "On V2X Evolution", 3GPP TSG RAN Rel-18 workshop, RWS-210005, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, Jun. 7, 2021, XP052025574, pp. 1-7, slide 5.

* cited by examiner

NETWORK CODING HANDOVER BETWEEN NETWORK CODING DEVICES

FIELD OF TECHNOLOGY

The following relates to wireless communications, including network coding handover between network coding devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network entities, each supporting wireless communication for communication devices, which may be known as user equipment (UE). Some wireless communications systems may support retransmissions of a packet by a transmitting wireless device (e.g., a user equipment (UE) or road-side unit (RSU)) to improve the chances that the packet is successfully received by one or more receiving wireless devices. In such systems, if a subset of the one or more receiving wireless devices fails to receive the packet, the transmitting wireless device may be triggered to retransmit the packet. Improved techniques for retransmitting one or more packets in a wireless communications system may be desirable.

SUMMARY

The described techniques relate to improved methods, systems, devices, and apparatuses that support network coding handover between network coding devices. A first network coding device may determine to hand over retransmission of a packet (e.g., the task of retransmitting the packet) to a second network coding device, and the first network coding device may use the techniques described herein to perform the handover. In one aspect, the first network coding device may transmit a negative acknowledgment (NACK) to a user equipment (UE) that originally transmitted the packet (e.g., source UE), and the source UE may transmit a request for any of one or more network coding devices to take over retransmission of the packet. In another aspect, the first network coding device may transmit a request for any of one or more network coding devices to take over retransmission of the packet. Because the first network coding device may hand over retransmission of the packet to the second network coding device, the first network coding device may avoid repeatedly retransmitting the packet if a target UE continues to fail to receive the packet, resulting in reduced overhead in a wireless communications system.

A method for wireless communication at a UE is described. The method includes transmitting a first request for a network coding device to retransmit a packet originally transmitted by the UE, receiving an accept message from a first network coding device indicating that the first network coding device is to retransmit the packet, receiving a negative acknowledgment from the first network coding device triggering handover of retransmission of the packet from the first network coding device, and transmitting a second request for a network coding device to retransmit the packet originally transmitted by the UE based on receiving the negative acknowledgment.

An apparatus for wireless communication at a UE is described. The apparatus includes a processor, memory coupled with the processor, and instructions stored in the memory. The instructions are executable by the processor to cause the apparatus to transmit a first request for a network coding device to retransmit a packet originally transmitted by the UE, receive an accept message from a first network coding device indicating that the first network coding device is to retransmit the packet, receive a negative acknowledgment from the first network coding device triggering handover of retransmission of the packet from the first network coding device, and transmit a second request for a network coding device to retransmit the packet originally transmitted by the UE based on receiving the negative acknowledgment.

Another apparatus for wireless communication at a UE is described. The apparatus includes means for transmitting a first request for a network coding device to retransmit a packet originally transmitted by the UE, means for receiving an accept message from a first network coding device indicating that the first network coding device is to retransmit the packet, means for receiving a negative acknowledgment from the first network coding device triggering handover of retransmission of the packet from the first network coding device, and means for transmitting a second request for a network coding device to retransmit the packet originally transmitted by the UE based on receiving the negative acknowledgment.

A non-transitory computer-readable medium storing code for wireless communication at a UE is described. The code includes instructions executable by a processor to transmit a first request for a network coding device to retransmit a packet originally transmitted by the UE, receive an accept message from a first network coding device indicating that the first network coding device is to retransmit the packet, receive a negative acknowledgment from the first network coding device triggering handover of retransmission of the packet from the first network coding device, and transmit a second request for a network coding device to retransmit the packet originally transmitted by the UE based on receiving the negative acknowledgment.

Some examples of the method, apparatuses, and non-transitory computer-readable medium described herein may further include operations, features, means, or instructions for transmitting the packet to one or more UEs and determining that at least one UE of the one or more UEs failed to receive the packet from the UE, where transmitting the first request for the network coding device to retransmit the packet may be based on the determining. Some examples of the method, apparatuses, and non-transitory computer-readable medium described herein may further include operations, features, means, or instructions for transmitting, in the second request, an indication of a second network coding device to retransmit the packet originally transmitted by the UE.

Some examples of the method, apparatuses, and non-transitory computer-readable medium described herein may further include operations, features, means, or instructions for transmitting, in the second request, an indication of at least one network coding device to avoid retransmitting the packet originally transmitted by the UE. Some examples of the method, apparatuses, and non-transitory computer-readable medium described herein may further include operations, features, means, or instructions for storing the packet in a buffer at the UE, where transmitting the second request for the network coding device to retransmit the packet may be based on storing the packet in the buffer at the UE. In some examples of the method, apparatuses, and non-transitory computer-readable medium described herein, the first request for the network coding device to retransmit the packet may be included in a first retransmission of the packet from the UE, and the second request for the network coding device to retransmit the packet may be included in a second retransmission of the packet from the UE.

A method for wireless communication at a first network coding device is described. The method includes receiving a first request for the first network coding device to retransmit a packet originally transmitted by a UE, transmitting an accept message to the UE indicating that the first network coding device is to retransmit the packet, determining to hand over retransmission of the packet, and transmitting a negative acknowledgment to the UE triggering handover of the retransmission of the packet from the first network coding device to a second network coding device based on the determining.

An apparatus for wireless communication at a first network coding device is described. The apparatus includes a processor, memory coupled with the processor, and instructions stored in the memory. The instructions are executable by the processor to cause the apparatus to receive a first request for the first network coding device to retransmit a packet originally transmitted by a UE, transmit an accept message to the UE indicating that the first network coding device is to retransmit the packet, determine to hand over retransmission of the packet, and transmit a negative acknowledgment to the UE triggering handover of the retransmission of the packet from the first network coding device to a second network coding device based on the determining.

Another apparatus for wireless communication at a first network coding device is described. The apparatus includes means for receiving a first request for the first network coding device to retransmit a packet originally transmitted by a UE, means for transmitting an accept message to the UE indicating that the first network coding device is to retransmit the packet, means for determining to hand over retransmission of the packet, and means for transmitting a negative acknowledgment to the UE triggering handover of the retransmission of the packet from the first network coding device to a second network coding device based on the determining.

A non-transitory computer-readable medium storing code for wireless communication at a first network coding device is described. The code includes instructions executable by a processor to receive a first request for the first network coding device to retransmit a packet originally transmitted by a UE, transmit an accept message to the UE indicating that the first network coding device is to retransmit the packet, determine to hand over retransmission of the packet, and transmit a negative acknowledgment to the UE triggering handover of the retransmission of the packet from the first network coding device to a second network coding device based on the determining.

Some examples of the method, apparatuses, and non-transitory computer-readable medium described herein may further include operations, features, means, or instructions for receiving a second request for the first network coding device to retransmit the packet originally transmitted by the UE and ignoring the second request based on determining to hand over retransmission of the packet. Some examples of the method, apparatuses, and non-transitory computer-readable medium described herein may further include operations, features, means, or instructions for determining that the first network coding device may be closest to the UE out of a set of multiple network coding devices, where transmitting the accept message to the UE may be based on determining that the first network coding device may be closest to the UE.

Some examples of the method, apparatuses, and non-transitory computer-readable medium described herein may further include operations, features, means, or instructions for receiving an indication of a location of each network coding device of the set of multiple network coding devices, where determining that the first network coding device may be closest to the UE may be based on receiving the indication of the location of each network coding device of the set of multiple network coding devices. In some examples of the method, apparatuses, and non-transitory computer-readable medium described herein, the indication of the location of each network coding device may be received in a sidelink control information message, a medium access control control element, or a radio resource control message.

A method for wireless communication at a first network coding device is described. The method includes receiving a first request for the first network coding device to retransmit a packet originally transmitted by a UE, transmitting an accept message to the UE indicating that the first network coding device is to retransmit the packet, determining to hand over retransmission of the packet, and transmitting a second request for a second network coding device to retransmit the packet based on the determining.

An apparatus for wireless communication at a first network coding device is described. The apparatus includes a processor, memory coupled with the processor, and instructions stored in the memory. The instructions are executable by the processor to cause the apparatus to receive a first request for the first network coding device to retransmit a packet originally transmitted by a UE, transmit an accept message to the UE indicating that the first network coding device is to retransmit the packet, determine to hand over retransmission of the packet, and transmit a second request for a second network coding device to retransmit the packet based on the determining.

Another apparatus for wireless communication at a first network coding device is described. The apparatus includes means for receiving a first request for the first network coding device to retransmit a packet originally transmitted by a UE, means for transmitting an accept message to the UE indicating that the first network coding device is to retransmit the packet, means for determining to hand over retransmission of the packet, and means for transmitting a second request for a second network coding device to retransmit the packet based on the determining.

A non-transitory computer-readable medium storing code for wireless communication at a first network coding device is described. The code includes instructions executable by a processor to receive a first request for the first network coding device to retransmit a packet originally transmitted by a UE, transmit an accept message to the UE indicating that the first network coding device is to retransmit the packet, determine to hand over retransmission of the packet, and transmit a second request for a second network coding device to retransmit the packet based on the determining.

Some examples of the method, apparatuses, and non-transitory computer-readable medium described herein may further include operations, features, means, or instructions for transmitting, in the second request, an indication of the second network coding device to retransmit the packet based on a load of the second network coding device. Some examples of the method, apparatuses, and non-transitory computer-readable medium described herein may further include operations, features, means, or instructions for receiving, from the second network coding device, an indication of the load of the second network coding device.

Some examples of the method, apparatuses, and non-transitory computer-readable medium described herein may further include operations, features, means, or instructions for monitoring transmissions from the second network coding device to determine a quantity and size of transmissions from the second network coding device and determining the load of the second network coding device based on the monitoring. Some examples of the method, apparatuses, and non-transitory computer-readable medium described herein may further include operations, features, means, or instructions for determining that the second network coding device transmitted another accept message to the UE to retransmit the packet and determining that the second network coding device may have the packet stored based on the second network coding device transmitting the other accept message to the UE to retransmit the packet.

Some examples of the method, apparatuses, and non-transitory computer-readable medium described herein may further include operations, features, means, or instructions for transmitting, in the second request, an indication of the second network coding device to retransmit the packet based on the second network coding device being closest to the UE out of a set of multiple network coding devices. Some examples of the method, apparatuses, and non-transitory computer-readable medium described herein may further include operations, features, means, or instructions for receiving an indication of a location of each network coding device of the set of multiple network coding devices and determining that the second network coding device may be closest to the UE out of the set of multiple network coding devices based on receiving the indication of the location of each network coding device of the set of multiple network coding devices.

In some examples of the method, apparatuses, and non-transitory computer-readable medium described herein, the indication of the location of each network coding device may be received in a sidelink control information message, a medium access control control element, or a radio resource control message. Some examples of the method, apparatuses, and non-transitory computer-readable medium described herein may further include operations, features, means, or instructions for transmitting, in the second request, an indication of the second network coding device to retransmit the packet based on determining that the second network coding device may have the packet stored in a buffer.

Some examples of the method, apparatuses, and non-transitory computer-readable medium described herein may further include operations, features, means, or instructions for transmitting, in the second request, an indication of the second network coding device to retransmit the packet and transmitting the packet to the second network coding device based on determining that the packet may be missing from a buffer at the second network coding device. Some examples of the method, apparatuses, and non-transitory computer-readable medium described herein may further include operations, features, means, or instructions for transmitting, in the second request, an indication of a group of network coding devices, each network coding device in the group being a candidate for retransmitting the packet.

In some examples of the method, apparatuses, and non-transitory computer-readable medium described herein, transmitting the second request for retransmission of the packet may include operations, features, means, or instructions for retransmitting the packet originally transmitted by the UE with the second request for retransmission of the packet. In some examples of the method, apparatuses, and non-transitory computer-readable medium described herein, transmitting the second request for retransmission of the packet may include operations, features, means, or instructions for transmitting a control message with the second request for the second network coding device to retransmit the packet. In some examples of the method, apparatuses, and non-transitory computer-readable medium described herein, the control message includes a sidelink control information message, a medium access control control element, or a radio resource control message.

DETAILED DESCRIPTION

Some wireless communications systems may support retransmissions of a packet by a transmitting device (e.g., a user equipment (UE) or road-side unit (RSU)) to improve the chances that the packet is successfully received by one or more receiving devices. In such systems, however, the overhead associated with retransmitting packets may be high. To minimize overhead, a wireless communications system may include network coding devices that may aggregate packets from multiple wireless devices in a single retransmission. As a result, the overhead of retransmissions in the wireless communications system may be reduced. In some cases, however, a network coding device may repeatedly attempt to retransmit a packet even though one or more target devices may continuously fail to receive the packet. In such cases, the reduction in overhead associated with using network coding devices for retransmissions may be negated, and the overhead of retransmissions in a wireless communications system may remain high.

As described herein, a wireless communications system may support efficient techniques for network coding handover between network coding devices (e.g., encoders). In some cases (e.g., after multiple failed retransmissions of a packet), a first network coding device may determine to hand over retransmission of a packet (e.g., the task of retransmitting the packet) to a second network coding device, and the first network coding device may use the techniques described herein to perform the handover. In one aspect, the first network coding device may transmit a negative acknowledgment (NACK) to a user equipment (UE) that originally transmitted the packet (e.g., source UE), and the source UE may transmit a request for any of one or more network coding devices to take over retransmission of the packet. In another aspect, the first network coding device may transmit a request for any of one or more network coding devices to take over retransmission of the packet. Because the first network coding device may hand over retransmission of the packet to the second network coding device, the first network coding device may avoid repeatedly retransmitting the packet if a target UE continues to fail to receive the packet, resulting in reduced overhead in a wireless communications system.

Aspects of the disclosure are initially described in the context of wireless communications systems. Examples of processes and signaling exchanges that support network coding handover between network coding devices are then described. Aspects of the disclosure are further illustrated by and described with reference to apparatus diagrams, system diagrams, and flowcharts that relate to network coding handover between network coding devices.

Figure 1:
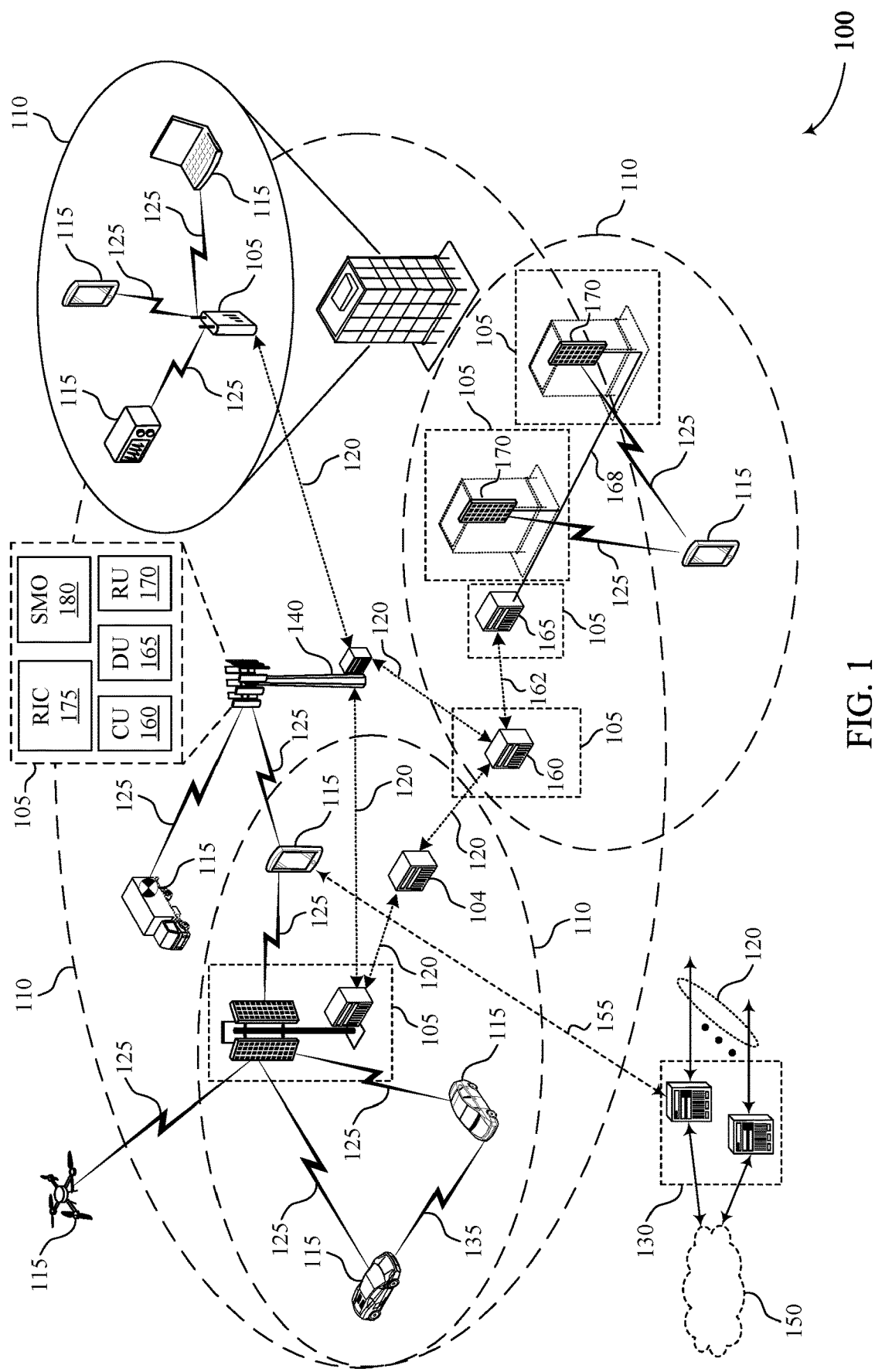
FIG. 1 illustrates an example of a wireless communications system that supports network coding handover between network coding devices in accordance with one or more aspects of the present disclosure.

FIG. 1 illustrates an example of a wireless communications system 100 that supports network coding handover between network coding devices in accordance with one or more aspects of the present disclosure. The wireless communications system 100 includes one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being anode. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support network coding handover between network coding devices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., in a physical downlink control channel (PDCCH) or a physical downlink shared channel (PDSCH)), uplink transmissions (e.g., return link transmissions) from a UE 115 to a network entity 105 (e.g., in a physical uplink control channel (PUCCH) or a physical uplink shared channel (PUSCH)), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

In some cases, a network entity 105 facilitates the scheduling of resources for sidelink communications. In other cases, sidelink communications are carried out between UEs 115 without the involvement of a network entity 105. According to some aspects, sidelink communications may include discovery expression transmissions on a physical sidelink discovery channel (PSDCH) (e.g., to allow proximal devices to discover each other's presence). According to some aspects, sidelink communications may include control information transmissions on a physical sidelink control channel (PSCCH). According to some aspects, sidelink communications may include data transmissions on a physical sidelink shared channel (PSSCH). According to some aspects, sidelink communications may include feedback transmissions on a physical sidelink feedback channel (PSFCH).

According to some aspects, sidelink communications may include LTE V2X or cellular V2X (C-V2X), NR V2X or C-V2X, and NR sidelink. In NR-V2X, two modes may be defined for resource allocation. In a first mode (e.g., mode-1), a network entity 105 may determine the resources used by a sidelink transmit UE 115 for a sidelink transmission (e.g., on a PSCCH, PSSCH, or PSFCH). In a second mode (e.g., mode-2), a sidelink transmit UE (e.g., not the network entity 105) may determine the resources to use for sidelink communications. Sensing and resource selection and reselection related procedures may be supported for the second mode. The sensing procedure may be defined as decoding the sidelink control information (SCI) from other UEs 115 and/or performing sidelink measurements. Decoding SCIs in the sensing procedure may provide at least some information on sidelink resources indicated by the UE 115 transmitting the SCI.

NR-V2X may support an initial transmission of a transport block from a sidelink UE 115 without reservation, based on sensing and a resource selection procedure. NR-V2X may support the reservation of a sidelink resource for an initial transmission of a transport block at least by an SCI associated with a different transport block, based on sensing and a resource selection procedure. In some cases, NR-V2X mode-2 may support resource reservation for feedback-based PSSCH retransmissions by signaling associated with a prior transmission of the same transport block (e.g., where the feedback may impact subsequent sensing and resource selection procedures). From the perspective of a transmit sidelink UE 115, the use of hybrid automatic repeat request (HARQ) feedback for the release of unused resources may be supported (e.g., with no additional signaling being defined for the purpose of the release of unused resources by the transmit UE 115). Additionally, in mode-2, the SCI payload may indicate the sub-channels and slots used by a UE 115 or reserved by a UE 115 for PSSCH transmissions or retransmissions.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. HARQ feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some cases, because the wireless communications system 100 may support retransmissions of a packet by a transmitting device, the overhead in the wireless communications system 100 may increase as the number of transmitting devices in the wireless communications system 100 increases. To minimize overhead, the wireless communications system 100 may include network coding devices that may aggregate packets from multiple wireless devices in a single retransmission. As a result, multiple retransmissions may be replaced by a single retransmission using network coding, and the overhead of retransmissions in the wireless communications system 100 may be reduced.

Figure 2:
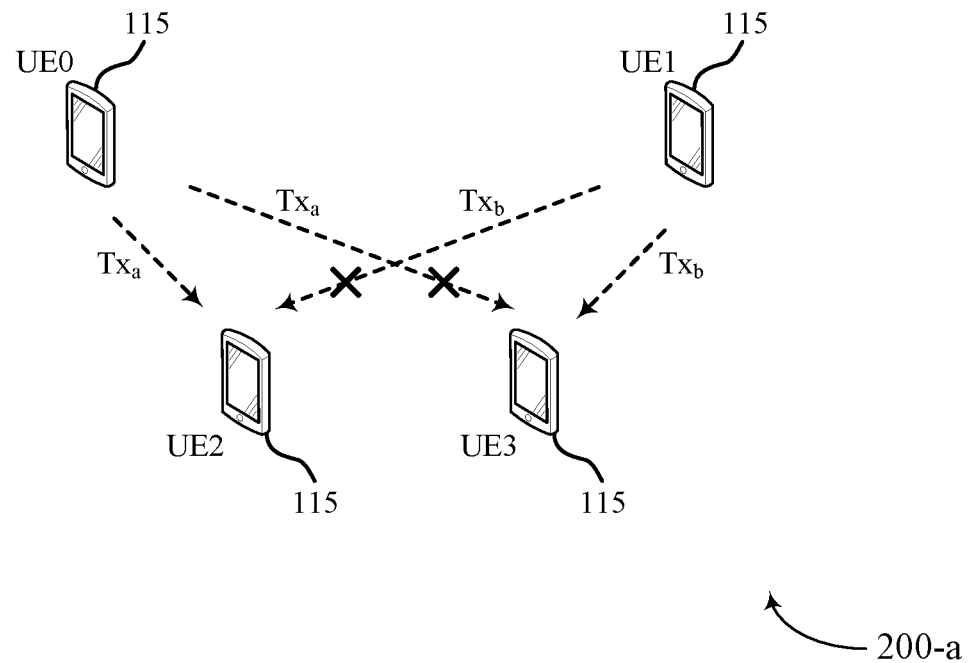
FIG. 2 illustrates an example of retransmissions using network coding in accordance with one or more aspects of the present disclosure.
Figure 2:
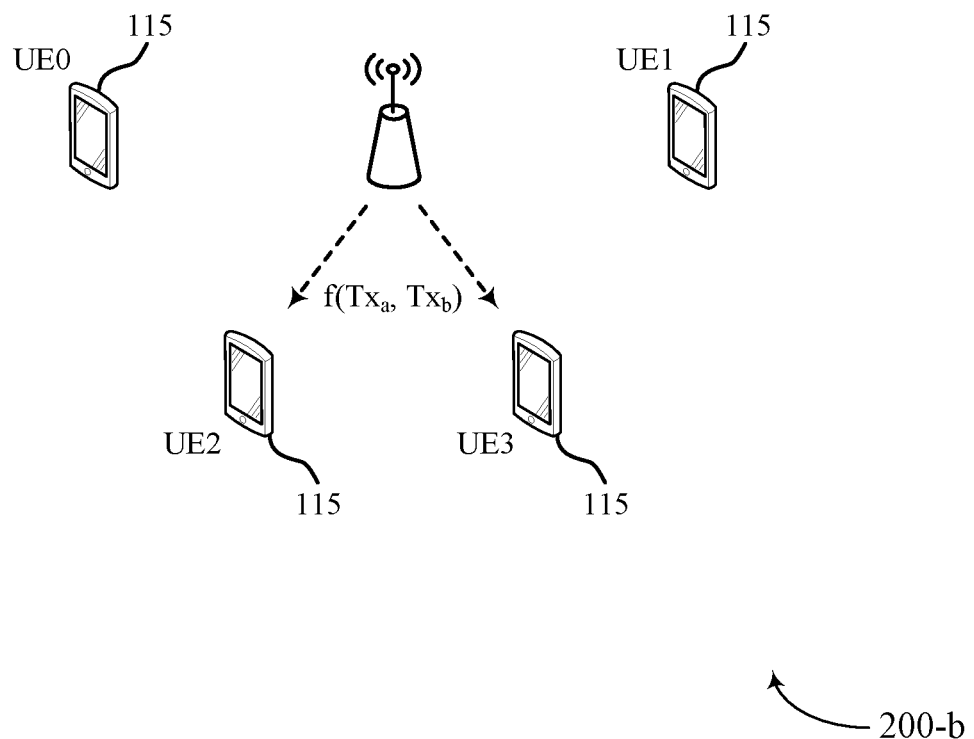

FIG. 2 illustrates an example of retransmissions 200 using network coding in accordance with one or more aspects of the present disclosure. Network coding may refer to the encoding of multiple packets to generate a single transmission at a network coding device, where each of the multiple packets may be associated with communication of (e.g., previously transmitted by) a different UE 115. Network coding may be used to increase system capacity and improve resource utilization. The increased system capacity and improved resource utilization may be achieved by reducing the number of retransmissions in a system while maintaining a performance metric. Network coding may enable an increase in the number of UEs 115 or in traffic per UE 115. As illustrated in a first example 200-a, one or more source UEs 115 (e.g., UE0 and UE1) may transmit packets (e.g., $Tx_a$ and $Tx_b$) to one or more target UEs 115 (e.g., UE2 and UE3). Then, in a second example 200-b, a network coding device may retransmit the packets to the one or more target UEs 115. That is, after an initial or original transmission, retransmissions by a source transmitter may be replaced by a retransmission by a network coding device. The retransmission by the network coding device may be a function of the original transmissions from the one or more source UEs 115 (e.g., $f(Tx_a, Tx_b)$). The network coding device may be a network entity 105, an RSU, or a UE 115.

In one example of network coding, single parity check codes may correct one erasure of a packet. For instance, an input of [a, b, c] may be encoded to [a, b, c, a⊕b⊕c] and then transmitted, where a, b, and c each correspond to different packets. A receiving device may then recover one erasure from the network coded transmission. In particular, if the received vector is [a, ?, c, a⊕b⊕c], the erased element (e.g., b) may be recovered by summing the other elements (e.g., a⊕c⊕(a⊕b⊕c)=b). Network coding may be viewed as a linear system (e.g., over a Galois field) with three variables and four linearly independent constraints in accordance with equation 1 below. Any three constraints (e.g., one erasure) may be sufficient to find the three variables. A single network coded transmission or encoded sequence from a network coding device may therefore replace multiple retransmissions or encoded sequences from multiple wireless devices.

$$\begin{bmatrix} 1 & 0 & 0 \\ 0 & 1 & 0 \\ 0 & 0 & 1 \\ 1 & 1 & 1 \end{bmatrix} \cdot [a \ b \ c]^T = [a \ b \ c \ a \oplus b \oplus c]^T \quad (1)$$

Figure 3:
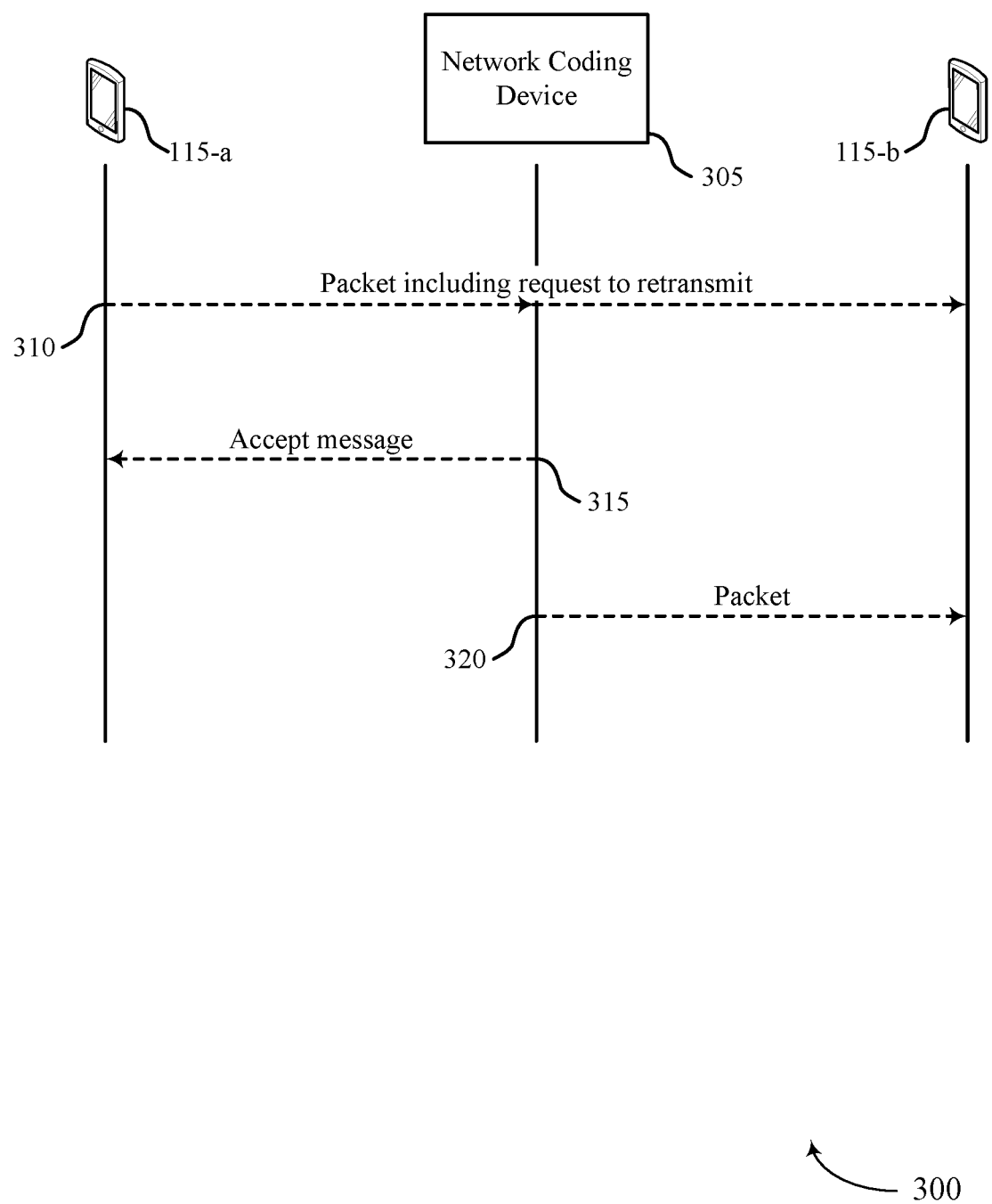
FIG. 3 illustrates an example of a process flow in accordance with one or more aspects of the present disclosure.

FIG. 3 illustrates an example of a process flow 300 in accordance with one or more aspects of the present disclosure. The process flow 300 may be an example protocol using network coding for sidelink communication. The process flow 300 includes a UE 115-a and a UE 115-b, which may be examples of UEs 115 described with reference to FIGS. 1 and 2. The process flow 300 also includes a network coding device 305, which may be an example of a network coding device described with reference to FIGS. 1 and 2. The network coding device 305 may be an RSU, relay, UE 115, or a network entity 105. At 310, the UE 115-a (e.g., source UE) may transmit a packet or transport block with a network coding request flag. The network coding device 305 may receive the packet or transport block with the network coding request flag from the UE 115-a, and, at 315, the network coding device 305 may transmit an accept message to the UE 115-a to accept the request (e.g., the request to retransmit the packet). That is, the network coding device 305 may send a message to accept the request to include the packet as part of a network coded transmission. At 320, the network coding device 305 may then transmit the packet in a network coded transmission to the UE 115-b.

In some cases, a network coding device may repeatedly attempt to retransmit a packet even though one or more wireless devices may continuously fail to receive the packet. In such cases, the reduction in overhead associated with using network coding devices for retransmissions may be negated, and the overhead of retransmissions in a wireless communications system may remain high. Wireless communication system 100 may support a procedure for handing over packets between network coding devices (e.g., encoders) for network coding (e.g., in mode-2 sidelink). Network coding devices may take over the retransmission of packets. In some cases, one packet is taken over by only one network coding device, such as an RSU, and it may be appropriate for one network coding device to hand over a packet to another network coding device or encoder (e.g., for improved transmission). The described techniques may enhance existing procedures and minimize signaling and transmissions (e.g., retransmissions). For instance, the described techniques may minimize the transmissions of packets between RSUs.

Figure 4:
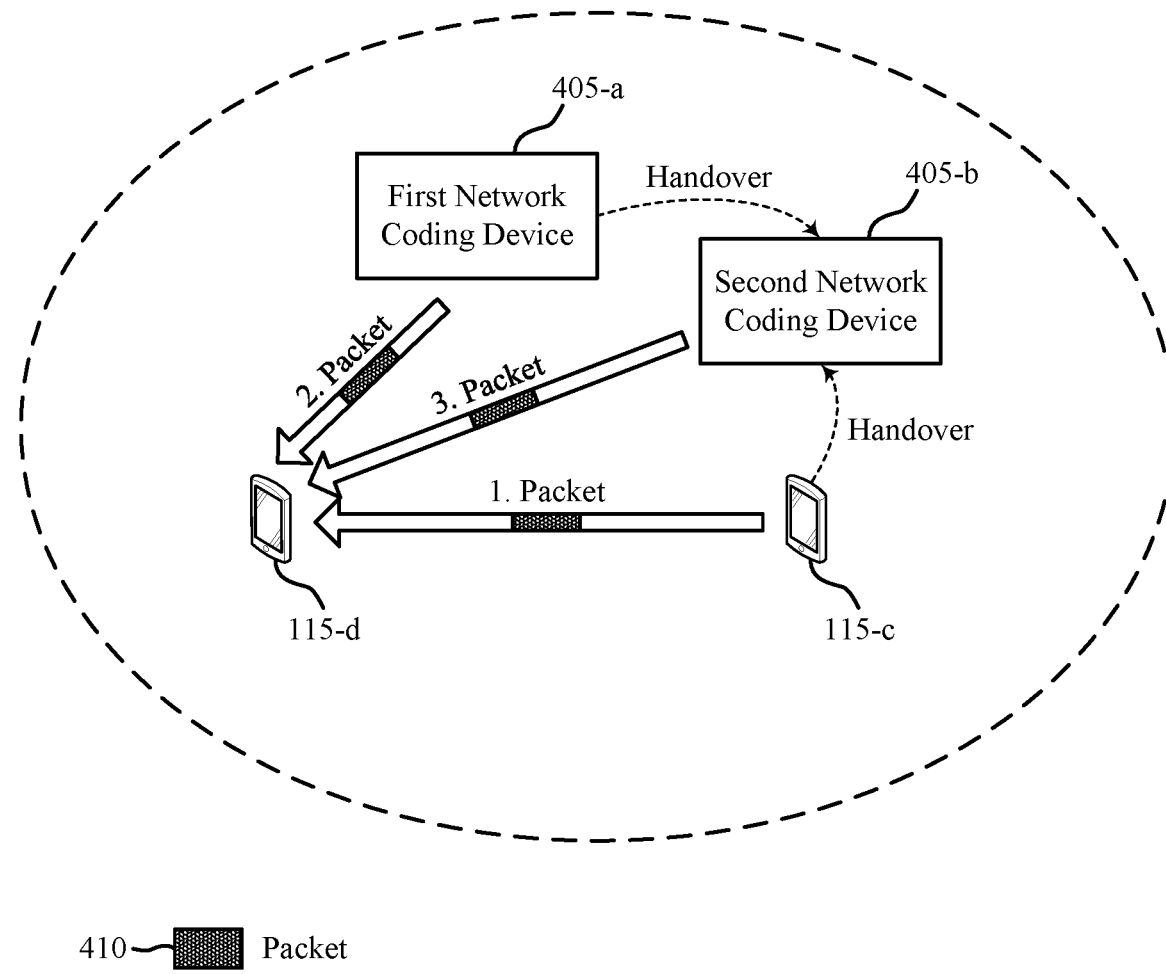
FIG. 4 illustrates an example of a wireless communications system that supports network coding handover between network coding devices in accordance with one or more aspects of the present disclosure.

FIG. 4 illustrates an example of a wireless communications system 400 that supports network coding handover between network coding devices in accordance with one or more aspects of the present disclosure. The wireless communications system 400 includes a first UE 115-c and a second UE 115-d, which may be examples of UEs 115 described with reference to FIGS. 1-3. The wireless communications system 400 also includes a first network coding device 405-a and a second network coding device 405-b, which may be examples of network coding devices described with reference to FIGS. 1-3. The wireless communications system 400 may implement aspects of the wireless communications system 100. For example, the wireless communications system 400 may support efficient techniques for handing over packets between network coding devices for network coding.

The first UE 115-c may transmit a packet 410 to the second UE 115-d, and the second UE 115-d may fail to receive or decode the packet 410. The first UE 115-c may then determine to retransmit the packet 410 to the second UE 115-d using network coding, and the first UE 115-c may transmit a request for a network coding device to retransmit the packet 410 to the second UE 115-d. The first network coding device 405-a may transmit an accept message to the first UE 115-c indicating that the first network coding device 405-a is to retransmit the packet 410 to the second UE 115-d, and the first network coding device 405-*a* may then proceed to retransmit the packet 410 to the second UE 115-*d*. In some cases, after accepting the task of retransmitting the packet 410, the first network coding device 405-*a* may determine to hand over the task of retransmitting the packet 410, and the first network coding device 405-*a* may use the techniques described herein to perform the handover.

In one aspect, the first UE 115-*c* may transmit a request for the second network coding device 405-*b* to take over retransmission of the packet 410. The first network coding device 405-*a* (e.g., an RSU) may transmit a NACK to the first UE 115-*c* (e.g., the source device), and the first UE 115-*c* may retransmit the packet 410 based on receiving the NACK. The retransmission of the packet 410 from the first UE 115-*c* may include (e.g., inherently or by default) a request for the second network coding device 405-*b* to take over retransmission of the packet 410 (e.g., a request for the retransmission to be taken over by an RSU). The use of a NACK to trigger the first UE 115-*c* to transmit the request for the second network coding device 405-*b* to take over retransmission of the packet 410 may be used for the handover of the packet 410 from the first network coding device 405-*a* to the second network coding device 405-*b* and may exploit existing network coding procedures. The first UE 115-*c* may store the packet 410 (e.g., transport block) in its buffer to be prepared to retransmit the packet 410 with the request for the second network coding device 405-*b* to take over retransmission of the packet 410.

In some cases, the header of the retransmission of the packet 410 from the first UE 115-*c* may include one bit indicating or requesting for a network coding device to take over retransmission of the packet 410. Further, in order to hand over the retransmission of the packet 410 to a different device, the header may also include an identifier (e.g., RSU ID) of the second network coding device 405-*b* to take over retransmission of the packet 410, where the second network coding device 405-*b* is different from the first network coding device 405-*a* (e.g., a different RSU than the first RSU). Additionally, or alternatively, the header may include one or more identifiers (e.g., RSU IDs) of network coding devices that may not take over retransmission of the packet 410 (e.g., network coding devices that are requested to avoid taking over retransmission of the packet 410), in order to avoid handing over the packet 410 to a network coding device (e.g., the first network coding device 405-*a*) that already attempted to retransmit the packet 410 (e.g., in order for the packet 410 not to be handed over to a same RSU where retransmission of the packet 410 was already unsuccessful).

In some examples, the first UE 115-*c* may transmit the request for a network coding device to take over retransmission of the packet 410 with identifiers of one or more network coding devices that are excluded from taking over retransmission of the packet 410. In some cases, the handover of the packet 410 may indicate that handover is to occur to a network coding device which is a shortest distance from the first UE 115-*c* (e.g., excluding the ones indicated by the identifiers in the request). In such examples, each network coding device or encoder may be able to identify its own location (e.g., global navigation satellite system (GNSS) location) and the locations of other network coding devices (e.g., encoders). Each network coding device in wireless communications system 400 may support signaling to broadcast its location to all other network coding devices. The signaling may take place using a SCI-2 format, a MAC control element (MAC-CE), a MAC header or sub-header, or an RRC message. Each network coding device may be able to identify the locations of other network coding devices within a region. For example, in some cases each network coding device is in charge of a cell with explicit boundaries.

In another aspect, the first network coding device 405-*a* may transmit a request for the second network coding device 405-*b* to take over retransmission of the packet 410 while retransmitting the packet 410 (e.g., the RSU may include a request for handover while sending a network coded packet). In this aspect, the second network coding device 405-*b* may save signaling, and, if the packet 410 is not stored in a buffer at the second network coding device 405-*b* (e.g., destination RSU), the second network coding device 405-*b* may decode a network coded packet from the first network coding device (e.g., and possible other network coding devices) to identify the packet 410 to retransmit. The header of the network coded packet 410 including the request may include one bit indicating (e.g., triggering) handover and may include an identifier of the second network coding device 405-*b* to take over retransmission of the packet 410 (e.g., an RSU ID to indicate which RSU to take over). In some examples, the first network coding device 405-*a* may randomly select or specifically (e.g., based on metrics associated with the other network coding devices) select the second network coding device 405-*b* to take over retransmission of the packet 410. Alternatively, if the first network coding device 405-*a* is unable to determine which network coding device to take over retransmission of the packet 410, the network coding devices receiving the request from the first network coding device 405-*a* may determine which network coding device is to take over retransmission of the packet 410.

In some cases, the first network coding device 405-*a* (e.g., source RSU) may determine the second network coding device 405-*b* (e.g., the best RSU) to take over retransmission of the packet 410 based on monitoring the loads of one or more network coding devices (e.g., other RSUs), the locations of the one or more network coding devices, or the transmissions and receptions of the one or more network coding devices. To identify the loads of the one or more network coding devices, the one or more network coding devices may periodically report their average loads to the first network coding device 405-*a*, or the first network coding device 405-*a* may monitor the quantity and the size of network coded packets sent by each of the one or more network coding devices (e.g., how often the network coded packets are sent and how large those packets are). Further, to identify the locations of the one or more network coding devices, each of the one or more network coding devices may support signaling to broadcast its location to all other network coding devices. The signaling may take place using an SCI-2 format, a MAC-CE, a MAC header or sub-header, or an RRC message.

Once the first network coding device 405-*a* is able to identify the loads of one or more network coding devices, the first network coding device 405-*a* may determine whether each of the one or more network coding devices is transmitting packets (e.g., transport blocks) that can be efficiently combined with the packet 410. In an example, the first network coding device 405-*a* may select the second network coding device 405-*b* to retransmit the packet 410 to the UE 115-*d* such that packets of the same size are combined. For instance, the network coding devices may try to combine longer transport blocks since the maximum transport block length is transmitted, and it may be inefficient to combine a short transport block with a long transport block if such a combination can be avoided since the combination of the short transport block with the long transport block may increase overhead. Thus, to allow for efficient combinations of transport blocks to form network coded packets, it may be appropriate for the first network coding device 405-*a* to identify the transport blocks in buffers of other network coding devices.

In yet another aspect, the first network coding device 405-*a* may explicitly signal for other network coding devices to take over retransmission of the packet 410. The signaling may take place using an SCI-2 format, a MAC-CE, or a MAC header or sub-header. The signaling may include one bit indicating handover of the packet 410 for network coding. The signaling may also include an identifier of the second network coding device 405-*b* (e.g., an RSU ID) to take over retransmission of the packet 410 or a group of network coding devices (e.g., a group of RSU IDs) each being a candidate for taking over retransmission of the packet 410 (e.g., the RSU may indicate a group of potential destination RSUs).

If the signaling includes the identifier of the second network coding device 405-*b* (e.g., one RSU ID), the first network coding device 405-*a* may determine the second network coding device 405-*b* (e.g., compute the best RSU) to take over retransmission of the packet 410 based on monitoring whether the second network coding device 405-*b* has the packet 410 in a buffer, monitoring the load of the second network coding device 405-*b*, monitoring the locations of one or more network coding devices including the second network coding device 405-*b*, and monitoring the transmissions and receptions of the second network coding device 405-*b*. The first network coding device 405-*a* may monitor whether the second network coding device 405-*b* has the packet 410 in its buffer by monitoring the network coding accept messages sent by other network coding devices.

If the signaling includes the identifier of the group of network coding devices (e.g., a group of RSU IDs), the network coding devices in the group that determine to take over retransmission of the packet 410 may send an acknowledgment or accept message to the first network coding device after a backoff (e.g., a random backoff). The earliest (e.g., first in time) network coding device to transmit an acknowledgment claim taking over retransmission of the packet 410 may block other network coding devices from taking over retransmission of the packet 410. For instance, the acknowledgment or accept message may include an identifier of a packet 410 (e.g., packet ID), and if a network coding device receives an acknowledgment or accept message with a packet ID, the network coding device may avoid transmitting an acknowledgment or accept message with the same packet ID.

Thus, after receiving the request for retransmission of the packet 410, the second network coding device 405-*b* may signal whether or not it will take over retransmission of the packet 410. If the second network coding device 405-*b* determines to take over retransmission of the packet 410, the second network coding device 405-*b* may signal to the first network coding device 405-*a* whether the packet 410 is stored in a buffer at the second network coding device 405-*b* (e.g., whether it has the packet 410 in its buffer). The signaling may take place using an SCI-2 format, a MAC-CE, a MAC header or sub-header, or an RRC message. If the second network coding device 405-*b* does not have the packet 410 in its buffer, the first network coding device 405-*a* may either reselect another network coding device to transmit or broadcast the packet 410 to the receivers (e.g., the UE 115-*d*) and to the second network coding device 405-*b*.

Figure 5:
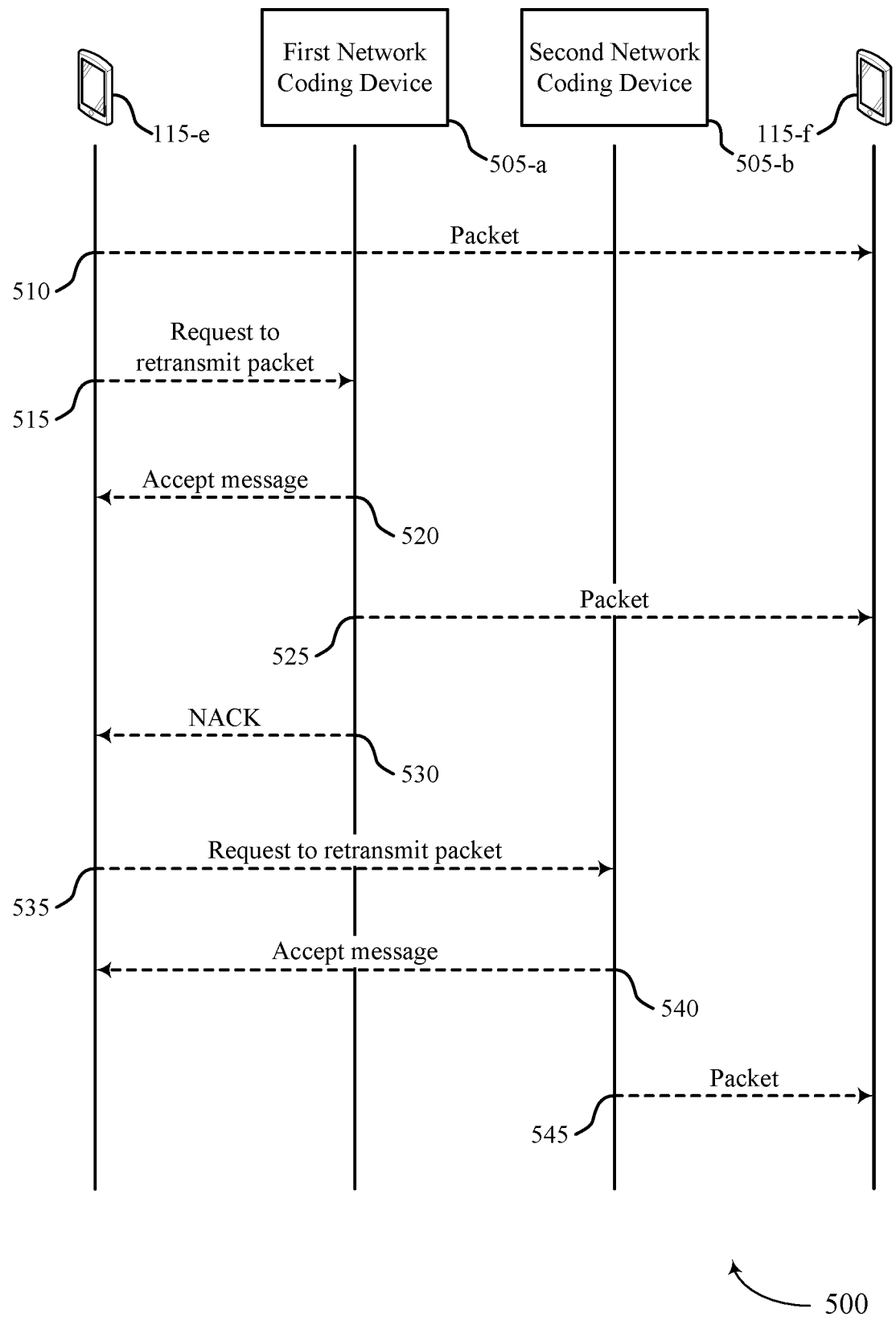
FIG. 5 illustrates an example of a process flow that supports network coding handover between network coding devices in accordance with one or more aspects of the present disclosure.

FIG. 5 illustrates an example of a process flow 500 that supports network coding handover between network coding devices in accordance with one or more aspects of the present disclosure. The process flow 500 includes a UE 115-*e* and a UE 115-*f*, which may be examples of UEs 115 described with reference to FIGS. 1-4. The process flow 500 also includes a first network coding device 505-*a* and a second network coding device 505-*b*, which may be examples of network coding devices described with reference to FIGS. 1-4. The process flow 500 may implement aspects of the wireless communications system 100. For instance, the process flow 500 may support efficient techniques for handing over packets between network coding devices for network coding.

In the following description of the process flow 500, the signaling exchanged between the first UE 115-*e*, the second UE 115-*f*, the first network coding device 505-*a*, and the second network coding device 505-*b* may be exchanged in a different order than the example order shown, or the operations performed by the first UE 115-*e*, the second UE 115-*f*, the first network coding device 505-*a*, and the second network coding device 505-*b* may be performed in different orders or at different times. Some operations may also be omitted from the process flow 500, and other operations may be added to the process flow 500.

At 510, the first UE 115-*e* may transmit a packet to one or more UEs 115 including the UE 115-*f*. The first UE 115-*e* may determine that at least one UE 115 (e.g., the second UE 115-*f*) failed to receive the packet from the first UE 115-*e*. At 515, the first UE 115-*e* may transmit a first request for a network coding device to retransmit the packet originally transmitted by the first UE 115-*e* based on determining that the at least one UE 115 failed to receive the packet from the first UE 115-*e*. In some cases, the first UE 115-*e* may transmit the first request in a retransmission of the packet or separately from the packet. The first UE 115-*e* may transmit the first request to one or more network coding devices including the first network coding device 505-*a* (e.g., in a broadcast or multicast transmission).

At 520, the first UE 115-*e* may receive an accept message from the first network coding device 505-*a* indicating that the first network coding device 505-*a* is to retransmit the packet. In some cases, the first network coding device 505-*a* may transmit the accept message to the first UE 115-*e* based on determining that the first network coding device 505-*a* is closest to the first UE 115-*e* or the second UE 115-*f* out of one or more network coding devices available to retransmit the packet. In some cases, the first network coding device 505-*a* may transmit the accept message to the first UE 115-*e* based on a load at the first network coding device 505-*a* or whether the first network coding device 505-*a* has the packet in a buffer. The one or more network coding devices available to retransmit the packet may include network coding devices that receive the first request or network coding devices within a region. The first network coding device 505-*a* may receive an indication of a location of each network coding device of the one or more network coding devices, and the first network coding device 505-*a* may determine that it is closest to the first UE 115-*e* or the second UE 115-*f* based on the location of each network coding device of the one or more network coding devices. The first network coding device 505-*a* may receive the indication of the location of each network coding device in an SCI message, a MAC-CE, or an RRC message.

At 525, the first network coding device 505-*a* may retransmit the packet (e.g., to be received by the second UE 115-*f* and any other UE 115 that failed to receive the packet).

At 530, the first UE 115-*e* may receive a NACK from the first network coding device triggering handover of retransmission of the packet from the first network coding device 505-*a* (e.g., handover of the task of retransmitting the packet). In some cases, the first UE 115-*e* may receive the NACK based on the second UE 115-*f* failing to successfully receive retransmissions of the packet from the first network coding device 505-*a*. At 535, the first UE 115-*e* may transmit a second request for a network coding device to retransmit the packet originally transmitted by the first UE 115-*e* based on receiving the NACK. The first UE 115-*e* may transmit the second request to one or more network coding devices including the second network coding device 505-*b* (e.g., in a broadcast or multicast transmission).

In some cases, the first UE 115-*e* may transmit, in the second request, an indication of the second network coding device 505-*b* to retransmit the packet originally transmitted by the first UE 115-*e*. In some cases, the first UE 115-*e* may transmit, in the second request, an indication of at least one network coding device to avoid retransmitting the packet originally transmitted by the first UE 115-*e*. The first UE 115-*e* may store the packet in a buffer such that the first UE 115-*e* may transmit the second request for a network coding device to retransmit the packet after the second UE 115-*f* fails to receive the packet in retransmissions from the first network coding device. In some cases, the first UE 115-*e* may transmit the second request in a retransmission of the packet or separately from the packet.

In some cases, the first network coding device 505-*a* may receive the second request to retransmit the packet originally transmitted by the first UE 115-*e*, and the first network coding device 505-*a* may ignore the second request based on determining to hand over retransmission of the packet. In one example, the first network coding device 505-*a* may identify that the second request is for retransmitting the packet already retransmitted by the first network coding device 505-*a* (e.g., one or more times) based on storing the packet in a buffer and comparing the packet associated with the second request to the packet stored in the buffer. In another example, the first network coding device 505-*a* may identify that the second request is for retransmitting the packet already transmitted by the first network coding device 505-*a* (e.g., one or more times) based on receiving an indication with the second request that the first network coding device 505-*a* is to avoid retransmitting the packet.

At 540, the first UE 115-*e* may receive an accept message from the second network coding device 505-*b* indicating that the second network coding device 505-*b* is to retransmit the packet. In some cases, the second network coding device 505-*b* may transmit the accept message to the first UE 115-*e* based on determining that the second network coding device 505-*b* is closest to the first UE 115-*e* or the second UE 115-*f* out of one or more network coding devices available to retransmit the packet. The one or more network coding devices available to retransmit the packet may include network coding devices that receive the second request or network coding devices within a region, excluding those network coding devices that have already retransmitted the packet. The second network coding device 505-*b* may receive an indication of a location of each network coding device of the one or more network coding devices, and the second network coding device 505-*b* may determine that it is closest to the first UE 115-*e* or the second UE 115-*f* based on the location of each network coding device of the one or more network coding devices. The second network coding device 505-*b* may receive the indication of the location of each network coding device in an SCI message, a MAC-CE, or an RRC message.

At 545, the second network coding device 505-*b* may retransmit the packet (e.g., to be received by the second UE 115-*f* and any other UE 115 that failed to receive the packet).

Figure 6:
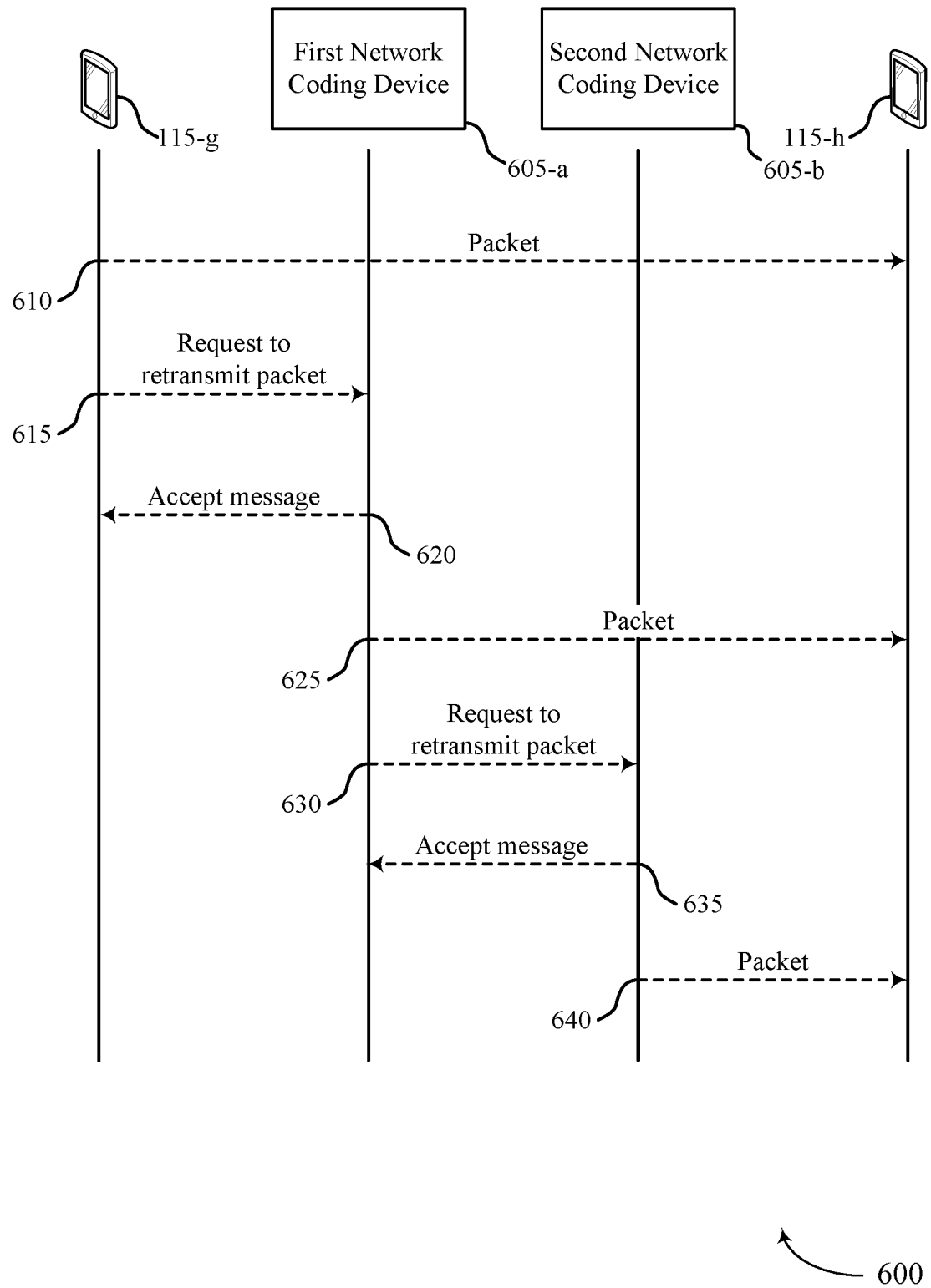
FIG. 6 illustrates an example of a process flow that supports network coding handover between network coding devices in accordance with one or more aspects of the present disclosure.

FIG. 6 illustrates an example of a process flow 600 that supports network coding handover between network coding devices in accordance with one or more aspects of the present disclosure. The process flow 600 includes a first UE 115-*g* and a second UE 115-*h*, which may be examples of UEs 115 described with reference to FIGS. 1-4. The process flow 600 also includes a first network coding device 605-*a* and a second network coding device 605-*b*, which may be examples of network coding devices described with reference to FIGS. 1-5. The process flow 600 may implement aspects of the wireless communications system 100. For instance, the process flow 600 may support efficient techniques for handing over packets between network coding devices for network coding.

In the following description of the process flow 600, the signaling exchanged between the first UE 115-*g*, the second UE 115-*h*, the first network coding device 605-*a*, and the second network coding device 605-*b* may be exchanged in a different order than the example order shown, or the operations performed by the first UE 115-*g*, the second UE 115-*h*, the first network coding device 605-*a*, and the second network coding device 605-*b* may be performed in different orders or at different times. Some operations may also be omitted from the process flow 600, and other operations may be added to the process flow 600.

At 610, the first UE 115-*g* may transmit a packet to one or more UEs 115 including the UE 115-*h*. The first UE 115-*g* may determine that at least one UE 115 (e.g., the second UE 115-*h*) failed to receive the packet from the first UE 115-*g*. At 615, the first UE 115-*g* may transmit a first request for a network coding device to retransmit the packet originally transmitted by the first UE 115-*g* based on determining that the at least one UE 115 failed to receive the packet from the first UE 115-*g*. In some cases, the first UE 115-*g* may transmit the first request in a retransmission of the packet or separately from the packet. The first UE 115-*g* may transmit the first request to one or more network coding devices including the first network coding device 605-*a* (e.g., in a broadcast or multicast transmission).

At 620, the first UE 115-*g* may receive an accept message from the first network coding device 605-*a* indicating that the first network coding device 605-*a* is to retransmit the packet. In some cases, the first network coding device 605-*a* may transmit the accept message to the first UE 115-*g* based on determining that the first network coding device 605-*a* is closest to the first UE 115-*g* or the second UE 115-*h* out of one or more network coding devices available to retransmit the packet. The one or more network coding devices available to retransmit the packet may include network coding devices that receive the first request or network coding devices within a region. The first network coding device 605-*a* may receive an indication of a location of each network coding device of the one or more network coding devices, and the first network coding device 605-*a* may determine that it is closest to the first UE 115-*g* or the second UE 115-*h* based on the location of each network coding device of the one or more network coding devices. The first network coding device 605-*a* may receive the indication of the location of each network coding device in an SCI message, a MAC-CE, or an RRC message.

At 625, the first network coding device 605-*a* may retransmit the packet (e.g., to be received by the second UE 115-*h* and any other UE 115 that failed to receive the packet). In some cases, the first network coding device 605-*a* may determine to hand over retransmission of the packet (e.g., based on the UE 115-*h* failing to receive the retransmissions from the first network coding device 605-*a*), and, at 630, the first network coding device 605-*a* may transmit a second request for a network coding device to retransmit the packet. In some cases, the first network coding device 605-*a* may transmit the second request in a retransmission of the packet or separately from the packet (e.g., in a control message, such as an SCI message, a MAC-CE, or an RRC message).

In some cases, the first network coding device 605-*a* may transmit, in the second request, an indication of the second network coding device 605-*b* to retransmit the packet based on a load of the second network coding device 605-*b*. In some cases, the first network coding device 605-*a* may receive, from the second network coding device 605-*b*, an indication of the load of the second network coding device 605-*b*. Additionally, or alternatively, the first network coding device 605-*a* may monitor transmissions from the second network coding device 605-*b* to determine a quantity and size of transmissions from the second network coding device 605-*b*, and the first network coding device 605-*a* may determine the load of the second network coding device 605-*b* based on the monitoring. The first network coding device 605-*a* may then select the second network coding device 605-*b* to retransmit the packet based on the load of the second network coding device 605-*b*.

In one example, the first network coding device 605-*a* may select the second network coding device 605-*b* to retransmit the packet based on the load of the second network coding device 605-*b* including packets of similar length to the packet to be retransmitted (e.g., the packet originally transmitted by the UE 115-*g* at 610). A network coded transmission including multiple transport blocks may be as long as the longest transport block of the multiple transport blocks. Thus, if the packet to be retransmitted is long, and the load of a third network coding device includes short packets, the first network coding device 605-*a* may avoid selecting the third network coding device to retransmit the packet (e.g., to avoid increasing the size of a network coded transmission from the third network coding device). In another example, the first network coding device 605-*a* may select the second network coding device 605-*b* to retransmit the packet based on the load of the second network coding device 605-*b* (e.g., quantity of packets in a network coded transmission from the second network coding device 605-*b*) being less than a threshold.

In some cases, the first network coding device 605-*a* may transmit, in the second request, an indication of the second network coding device 605-*b* to retransmit the packet based on the second network coding device 605-*b* being closest to the first UE 115-*g* or the second UE 115-*h* out of one or more network coding devices available to retransmit the packet. The first network coding device 605-*a* may receive an indication of a location of each network coding device of the one or more network coding devices, and the first network coding device 605-*a* may determine that the second network coding device 605-*b* is closest to the first UE 115-*g* or the second UE 115-*h* out of the one or more network coding devices based on receiving the indication of the location of each network coding devices of the one or more network coding devices. The first network coding device 605-*a* may receive the indication of the location of each network coding device in an SCI message, a MAC-CE, or an RRC message.

In some cases, the first network coding device 605-*a* may transmit, in the second request, an indication of the second network coding device 605-*b* to retransmit the packet based on determining that the second network coding device 605-*b* has the packet stored in a buffer. The first network coding device 605-*a* may determine that the second network coding device 605-*b* has the packet stored in the buffer based on the second network coding device 605-*b* transmitting an accept message to the first UE 115-*g* to retransmit the packet. In some examples, the first network coding device 605-*a* or the second network coding device 605-*b* may receive the packet (e.g., at 610) and store the packet in a buffer. In some cases, the first network coding device 605-*a* may transmit, in the second request, an indication of the second network coding device 605-*b* to retransmit the packet, and the first network coding device 605-*a* may transmit the packet to the second network coding device 605-*b* based on determining that the packet is missing from a buffer at the second network coding device 605-*b*. In some cases, the first network coding device 605-*a* may transmit, in the second request, an indication of a group of network coding devices, each network coding device in the group being a candidate for retransmitting the packet.

At 635, the second network coding device 605-*b* may transmit an accept message to the first network coding device 605-*a*, and, at 640, the second network coding device 605-*b* may retransmit the packet (e.g., to be received by the second UE 115-*h* and any other UE 115 that failed to receive the packet).

Figure 7:
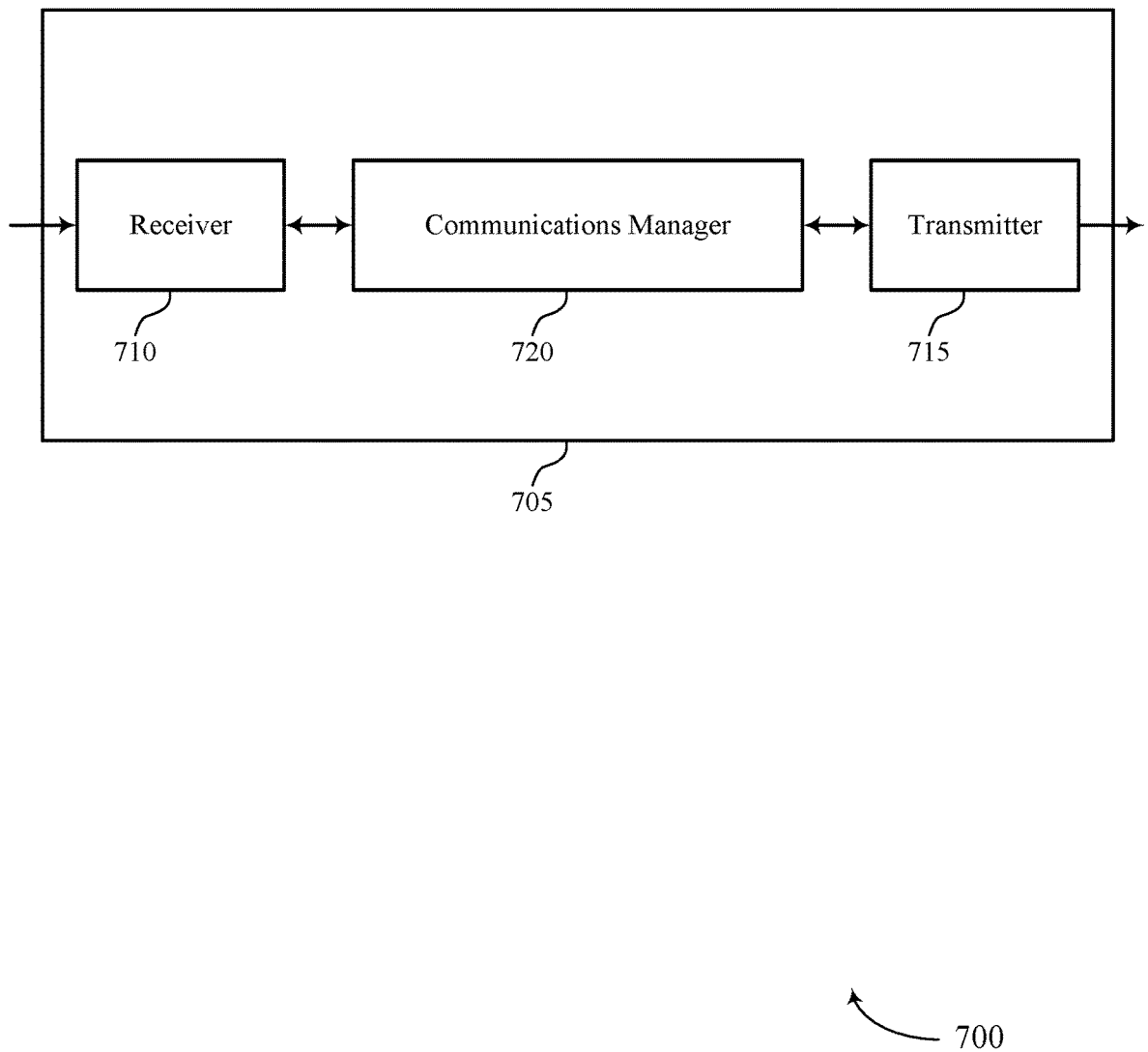
FIGS. 7 and 8 show block diagrams of devices that support network coding handover between network coding devices in accordance with one or more aspects of the present disclosure.

FIG. 7 shows a block diagram 700 of a device 705 that supports network coding handover between network coding devices in accordance with one or more aspects of the present disclosure. The device 705 may be an example of aspects of a UE 115 (e.g., a network coding device) as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to network coding handover between network coding devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to network coding handover between network coding devices). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of network coding handover between network coding devices as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for transmitting a first request for a network coding device to retransmit a packet originally transmitted by the UE. The communications manager 720 may be configured as or otherwise support a means for receiving an accept message from a first network coding device indicating that the first network coding device is to retransmit the packet. The communications manager 720 may be configured as or otherwise support a means for receiving a negative acknowledgment from the first network coding device triggering handover of retransmission of the packet from the first network coding device. The communications manager 720 may be configured as or otherwise support a means for transmitting a second request for a network coding device to retransmit the packet originally transmitted by the UE based on receiving the negative acknowledgment.

Additionally, or alternatively, the communications manager 720 may support wireless communication at a first network coding device in accordance with examples as disclosed herein. For example, the communications manager 720 may be configured as or otherwise support a means for receiving a first request for the first network coding device to retransmit a packet originally transmitted by a UE. The communications manager 720 may be configured as or otherwise support a means for transmitting an accept message to the UE indicating that the first network coding device is to retransmit the packet. The communications manager 720 may be configured as or otherwise support a means for determining to hand over retransmission of the packet. The communications manager 720 may be configured as or otherwise support a means for transmitting a negative acknowledgment to the UE triggering handover of the retransmission of the packet from the first network coding device to a second network coding device based on the determining.

Additionally, or alternatively, the communications manager 720 may support wireless communication at a first network coding device in accordance with examples as disclosed herein. For example, the communications manager 720 may be configured as or otherwise support a means for receiving a first request for the first network coding device to retransmit a packet originally transmitted by a UE. The communications manager 720 may be configured as or otherwise support a means for transmitting an accept message to the UE indicating that the first network coding device is to retransmit the packet. The communications manager 720 may be configured as or otherwise support a means for determining to hand over retransmission of the packet. The communications manager 720 may be configured as or otherwise support a means for transmitting a second request for a second network coding device to retransmit the packet based on the determining.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced power consumption, and more efficient utilization of communication resources. Because the device 705 may facilitate the handover of retransmission of a packet from a first network coding device to a second network coding device, overhead associated with retransmissions may be reduced while the likelihood that the packet may be successfully received by a wireless device may increase. As such, processing and power consumption associated with retransmissions of the packet may be reduced and less resources may be used the retransmissions of the packet.

Figure 8:
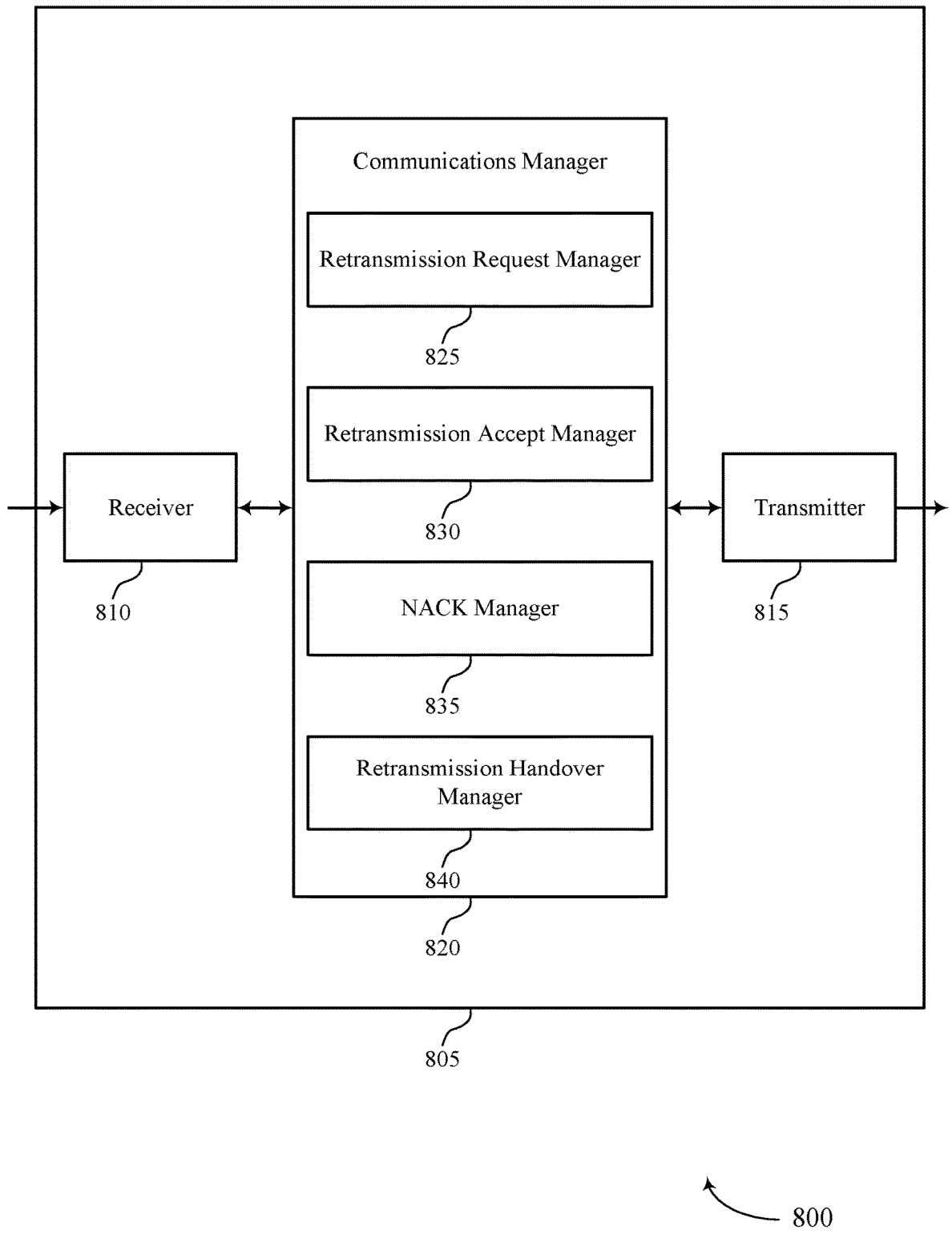

FIG. 8 shows a block diagram 800 of a device 805 that supports network coding handover between network coding devices in accordance with one or more aspects of the present disclosure. The device 805 may be an example of aspects of a device 705 or a UE 115 (e.g., a network coding device) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to network coding handover between network coding devices). Information may be passed on to other components of the device 805. The receiver 810 may utilize a single antenna or a set of multiple antennas.

The transmitter 815 may provide a means for transmitting signals generated by other components of the device 805.

For example, the transmitter 815 may transmit information such as packets, user data, control information, or any combination thereof associated with various information channels (e.g., control channels, data channels, information channels related to network coding handover between network coding devices). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of network coding handover between network coding devices as described herein. For example, the communications manager 820 may include a retransmission request manager 825, a retransmission accept manager 830, a NACK manager 835, a retransmission handover manager 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The retransmission request manager 825 may be configured as or otherwise support a means for transmitting a first request for a network coding device to retransmit a packet originally transmitted by the UE. The retransmission accept manager 830 may be configured as or otherwise support a means for receiving an accept message from a first network coding device indicating that the first network coding device is to retransmit the packet. The NACK manager 835 may be configured as or otherwise support a means for receiving a negative acknowledgment from the first network coding device triggering handover of retransmission of the packet from the first network coding device. The retransmission request manager 825 may be configured as or otherwise support a means for transmitting a second request for a network coding device to retransmit the packet originally transmitted by the UE based on receiving the negative acknowledgment.

Additionally, or alternatively, the communications manager 820 may support wireless communication at a first network coding device in accordance with examples as disclosed herein. The retransmission request manager 825 may be configured as or otherwise support a means for receiving a first request for the first network coding device to retransmit a packet originally transmitted by a UE. The retransmission accept manager 830 may be configured as or otherwise support a means for transmitting an accept message to the UE indicating that the first network coding device is to retransmit the packet. The retransmission handover manager 840 may be configured as or otherwise support a means for determining to hand over retransmission of the packet. The NACK manager 835 may be configured as or otherwise support a means for transmitting a negative acknowledgment to the UE triggering handover of the retransmission of the packet from the first network coding device to a second network coding device based on the determining.

Additionally, or alternatively, the communications manager 820 may support wireless communication at a first network coding device in accordance with examples as disclosed herein. The retransmission request manager 825 may be configured as or otherwise support a means for receiving a first request for the first network coding device to retransmit a packet originally transmitted by a UE. The retransmission accept manager 830 may be configured as or otherwise support a means for transmitting an accept message to the UE indicating that the first network coding device is to retransmit the packet. The retransmission handover manager 840 may be configured as or otherwise support a means for determining to hand over retransmission of the packet. The retransmission request manager 825 may be configured as or otherwise support a means for transmitting a second request for a second network coding device to retransmit the packet based on the determining.

Figure 9:
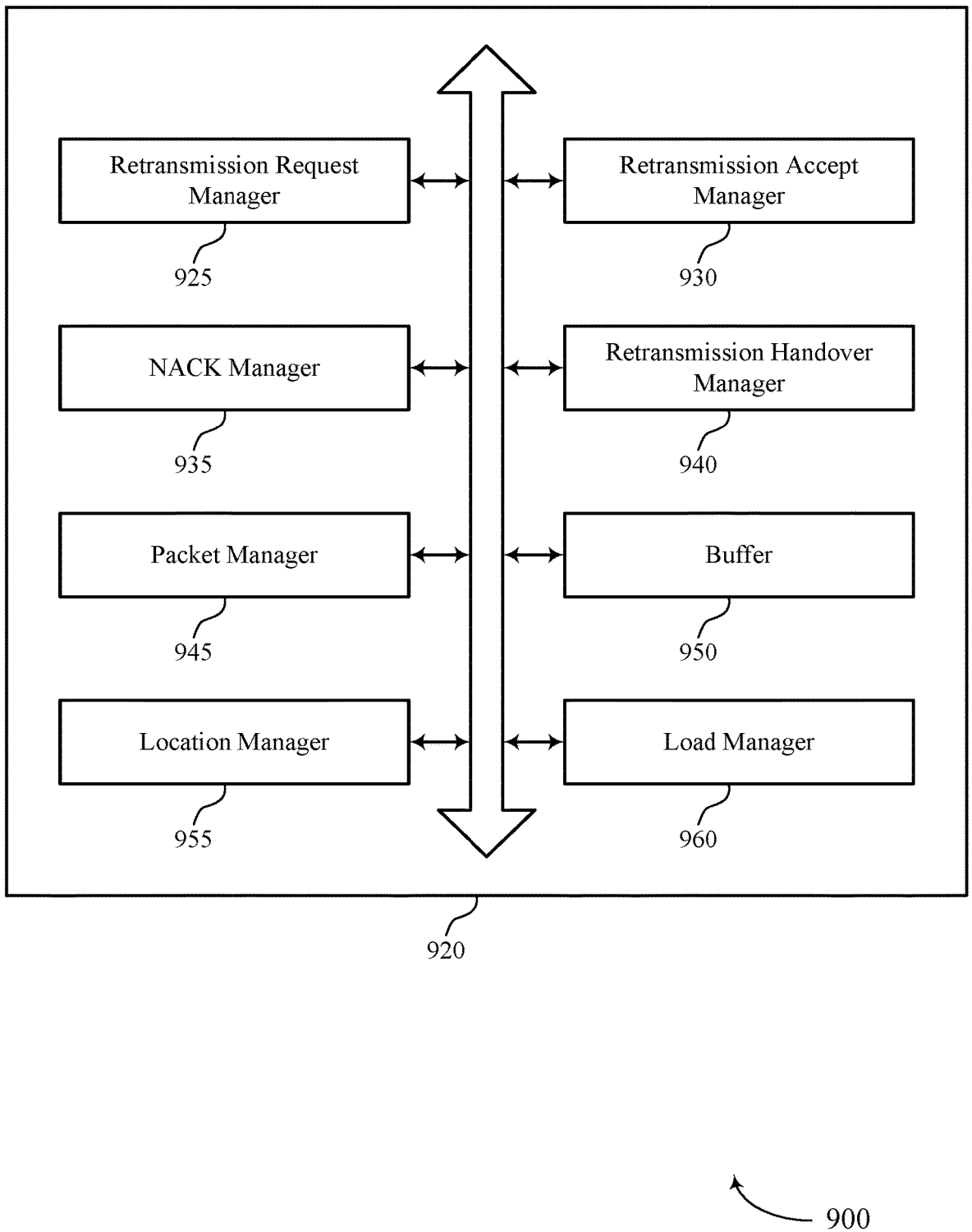
FIG. 9 shows a block diagram of a communications manager that supports network coding handover between network coding devices in accordance with one or more aspects of the present disclosure.

FIG. 9 shows a block diagram 900 of a communications manager 920 that supports network coding handover between network coding devices in accordance with one or more aspects of the present disclosure. The communications manager 920 may be an example of aspects of a communications manager 720, a communications manager 820, or both, as described herein. The communications manager 920, or various components thereof, may be an example of means for performing various aspects of network coding handover between network coding devices as described herein. For example, the communications manager 920 may include a retransmission request manager 925, a retransmission accept manager 930, a NACK manager 935, a retransmission handover manager 940, a packet manager 945, a buffer 950, a location manager 955, a load manager 960, or any combination thereof. Each of these components may communicate, directly or indirectly, with one another (e.g., via one or more buses).

The communications manager 920 may support wireless communication at a UE in accordance with examples as disclosed herein. The retransmission request manager 925 may be configured as or otherwise support a means for transmitting a first request for a network coding device to retransmit a packet originally transmitted by the UE. The retransmission accept manager 930 may be configured as or otherwise support a means for receiving an accept message from a first network coding device indicating that the first network coding device is to retransmit the packet. The NACK manager 935 may be configured as or otherwise support a means for receiving a negative acknowledgment from the first network coding device triggering handover of retransmission of the packet from the first network coding device. In some examples, the retransmission request manager 925 may be configured as or otherwise support a means for transmitting a second request for a network coding device to retransmit the packet originally transmitted by the UE based on receiving the negative acknowledgment.

In some examples, the packet manager 945 may be configured as or otherwise support a means for transmitting the packet to one or more UEs. In some examples, the retransmission request manager 925 may be configured as or otherwise support a means for determining that at least one UE of the one or more UEs failed to receive the packet from the UE, where transmitting the first request for the network coding device to retransmit the packet is based on the determining.

In some examples, the retransmission request manager 925 may be configured as or otherwise support a means for transmitting, in the second request, an indication of a second network coding device to retransmit the packet originally transmitted by the UE.

In some examples, the retransmission request manager 925 may be configured as or otherwise support a means for transmitting, in the second request, an indication of at least one network coding device to avoid retransmitting the packet originally transmitted by the UE.

In some examples, the buffer 950 may be configured as or otherwise support a means for storing the packet in a buffer at the UE, where transmitting the second request for the network coding device to retransmit the packet is based on storing the packet in the buffer at the UE.

In some examples, the first request for the network coding device to retransmit the packet is included in a first retransmission of the packet from the UE, and the second request for the network coding device to retransmit the packet is included in a second retransmission of the packet from the UE.

Additionally, or alternatively, the communications manager 920 may support wireless communication at a first network coding device in accordance with examples as disclosed herein. In some examples, the retransmission request manager 925 may be configured as or otherwise support a means for receiving a first request for the first network coding device to retransmit a packet originally transmitted by a UE. In some examples, the retransmission accept manager 930 may be configured as or otherwise support a means for transmitting an accept message to the UE indicating that the first network coding device is to retransmit the packet. The retransmission handover manager 940 may be configured as or otherwise support a means for determining to hand over retransmission of the packet. In some examples, the NACK manager 935 may be configured as or otherwise support a means for transmitting a negative acknowledgment to the UE triggering handover of the retransmission of the packet from the first network coding device to a second network coding device based on the determining.

In some examples, the retransmission request manager 925 may be configured as or otherwise support a means for receiving a second request for the first network coding device to retransmit the packet originally transmitted by the UE. In some examples, the retransmission request manager 925 may be configured as or otherwise support a means for ignoring the second request based on determining to hand over retransmission of the packet.

In some examples, the location manager 955 may be configured as or otherwise support a means for determining that the first network coding device is closest to the UE out of a set of multiple network coding devices, where transmitting the accept message to the UE is based on determining that the first network coding device is closest to the UE.

In some examples, the location manager 955 may be configured as or otherwise support a means for receiving an indication of a location of each network coding device of the set of multiple network coding devices, where determining that the first network coding device is closest to the UE is based on receiving the indication of the location of each network coding device of the set of multiple network coding devices.

In some examples, the indication of the location of each network coding device is received in a sidelink control information message, a medium access control control element, or a radio resource control message.

Additionally, or alternatively, the communications manager 920 may support wireless communication at a first network coding device in accordance with examples as disclosed herein. In some examples, the retransmission request manager 925 may be configured as or otherwise support a means for receiving a first request for the first network coding device to retransmit a packet originally transmitted by a UE. In some examples, the retransmission accept manager 930 may be configured as or otherwise support a means for transmitting an accept message to the UE indicating that the first network coding device is to retransmit the packet. In some examples, the retransmission handover manager 940 may be configured as or otherwise support a means for determining to hand over retransmission of the packet. In some examples, the retransmission request manager 925 may be configured as or otherwise support a means for transmitting a second request for a second network coding device to retransmit the packet based on the determining.

In some examples, the retransmission request manager 925 may be configured as or otherwise support a means for transmitting, in the second request, an indication of the second network coding device to retransmit the packet based on a load of the second network coding device.

In some examples, the load manager 960 may be configured as or otherwise support a means for receiving, from the second network coding device, an indication of the load of the second network coding device.

In some examples, the load manager 960 may be configured as or otherwise support a means for monitoring transmissions from the second network coding device to determine a quantity and size of transmissions from the second network coding device. In some examples, the load manager 960 may be configured as or otherwise support a means for determining the load of the second network coding device based on the monitoring.

In some examples, the retransmission handover manager 940 may be configured as or otherwise support a means for determining that the second network coding device transmitted another accept message to the UE to retransmit the packet. In some examples, the retransmission handover manager 940 may be configured as or otherwise support a means for determining that the second network coding device has the packet stored (e.g., in a buffer) based on the second network coding device transmitting the other accept message to the UE to retransmit the packet.

In some examples, the retransmission request manager 925 may be configured as or otherwise support a means for transmitting, in the second request, an indication of the second network coding device to retransmit the packet based on the second network coding device being closest to the UE out of a set of multiple network coding devices.

In some examples, the location manager 955 may be configured as or otherwise support a means for receiving an indication of a location of each network coding device of the set of multiple network coding devices. In some examples, the location manager 955 may be configured as or otherwise support a means for determining that the second network coding device is closest to the UE out of the set of multiple network coding devices based on receiving the indication of the location of each network coding device of the set of multiple network coding devices.

In some examples, the indication of the location of each network coding device is received in a sidelink control information message, a medium access control control element, or a radio resource control message.

In some examples, the retransmission request manager 925 may be configured as or otherwise support a means for transmitting, in the second request, an indication of the second network coding device to retransmit the packet based on determining that the second network coding device has the packet stored in a buffer.

In some examples, the retransmission request manager 925 may be configured as or otherwise support a means for transmitting, in the second request, an indication of the second network coding device to retransmit the packet. In some examples, the retransmission handover manager 940 may be configured as or otherwise support a means for transmitting the packet to the second network coding device based on determining that the packet is missing from a buffer at the second network coding device.

In some examples, the retransmission request manager 925 may be configured as or otherwise support a means for transmitting, in the second request, an indication of a group of network coding devices, each network coding device in the group being a candidate for retransmitting the packet.

In some examples, to support transmitting the second request for retransmission of the packet, the retransmission request manager 925 may be configured as or otherwise support a means for retransmitting the packet originally transmitted by the UE with the second request for retransmission of the packet.

In some examples, to support transmitting the second request for retransmission of the packet, the retransmission request manager 925 may be configured as or otherwise support a means for transmitting a control message with the second request for the second network coding device to retransmit the packet.

In some examples, the control message includes a sidelink control information message, a medium access control control element, or a radio resource control message.

Figure 10:
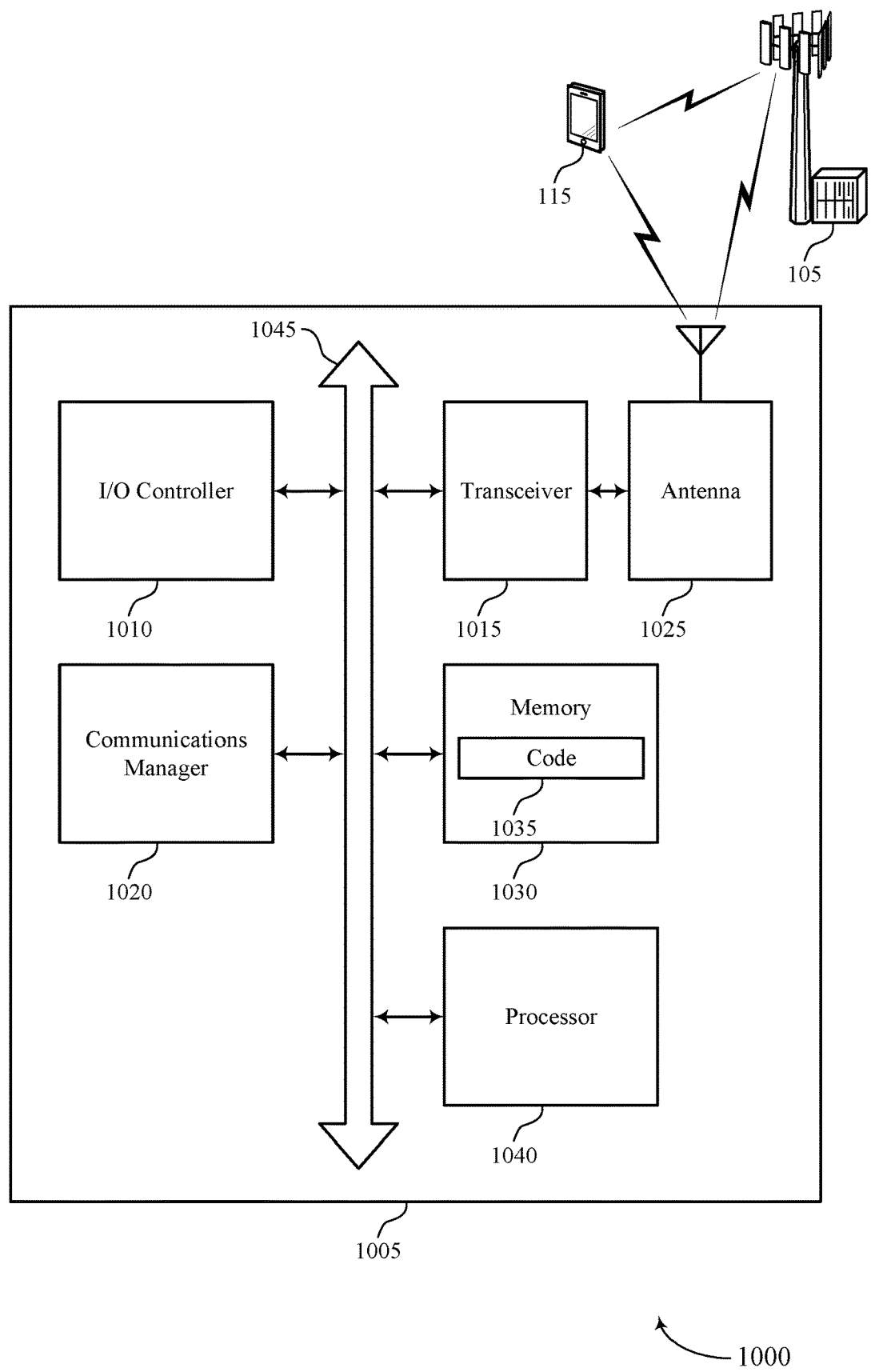
FIG. 10 shows a diagram of a system including a device that supports network coding handover between network coding devices in accordance with one or more aspects of the present disclosure.

FIG. 10 shows a diagram of a system 1000 including a device 1005 that supports network coding handover between network coding devices in accordance with one or more aspects of the present disclosure. The device 1005 may be an example of or include the components of a device 705, a device 805, or a UE 115 (e.g., a network coding device) as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting network coding handover between network coding devices). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for transmitting a first request for a network coding device to retransmit a packet originally transmitted by the UE. The communications manager 1020 may be configured as or otherwise support a means for receiving an accept message from a first network coding device indicating that the first network coding device is to retransmit the packet. The communications manager 1020 may be configured as or otherwise support a means for receiving a negative acknowledgment from the first network coding device triggering handover of retransmission of the packet from the first network coding device. The communications manager 1020 may be configured as or otherwise support a means for transmitting a second request for a network coding device to retransmit the packet originally transmitted by the UE based on receiving the negative acknowledgment.

Additionally, or alternatively, the communications manager 1020 may support wireless communication at a first network coding device in accordance with examples as disclosed herein. For example, the communications manager 1020 may be configured as or otherwise support a means for receiving a first request for the first network coding device to retransmit a packet originally transmitted by a UE. The communications manager 1020 may be configured as or otherwise support a means for transmitting an accept message to the UE indicating that the first network coding device is to retransmit the packet. The communications manager 1020 may be configured as or otherwise support a means for determining to hand over retransmission of the packet. The communications manager 1020 may be configured as or otherwise support a means for transmitting a negative acknowledgment to the UE triggering handover of the retransmission of the packet from the first network coding device to a second network coding device based on the determining.

Additionally, or alternatively, the communications manager 1020 may support wireless communication at a first network coding device in accordance with examples as disclosed herein. For example, the communications manager 1020 may be configured as or otherwise support a means for receiving a first request for the first network coding device to retransmit a packet originally transmitted by a UE. The communications manager 1020 may be configured as or otherwise support a means for transmitting an accept message to the UE indicating that the first network coding device is to retransmit the packet. The communications manager 1020 may be configured as or otherwise support a means for determining to hand over retransmission of the packet. The communications manager 1020 may be configured as or otherwise support a means for transmitting a second request for a second network coding device to retransmit the packet based on the determining.

By including or configuring the communications manager 1020 in accordance with examples as described herein, the device 1005 may support techniques for reduced processing, reduced power consumption, and more efficient utilization of communication resources. Because the device 1005 may facilitate the handover of retransmission of a packet from a first network coding device to a second network coding device, overhead associated with retransmissions may be reduced while the likelihood that the packet may be successfully received by a wireless device may increase. As such, processing and power consumption associated with retransmissions of the packet may be reduced and less resources may be used the retransmissions of the packet.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of network coding handover between network coding devices as described herein, or the processor 1040 and the memory 1030 may be otherwise configured to perform or support such operations.

Figure 11:
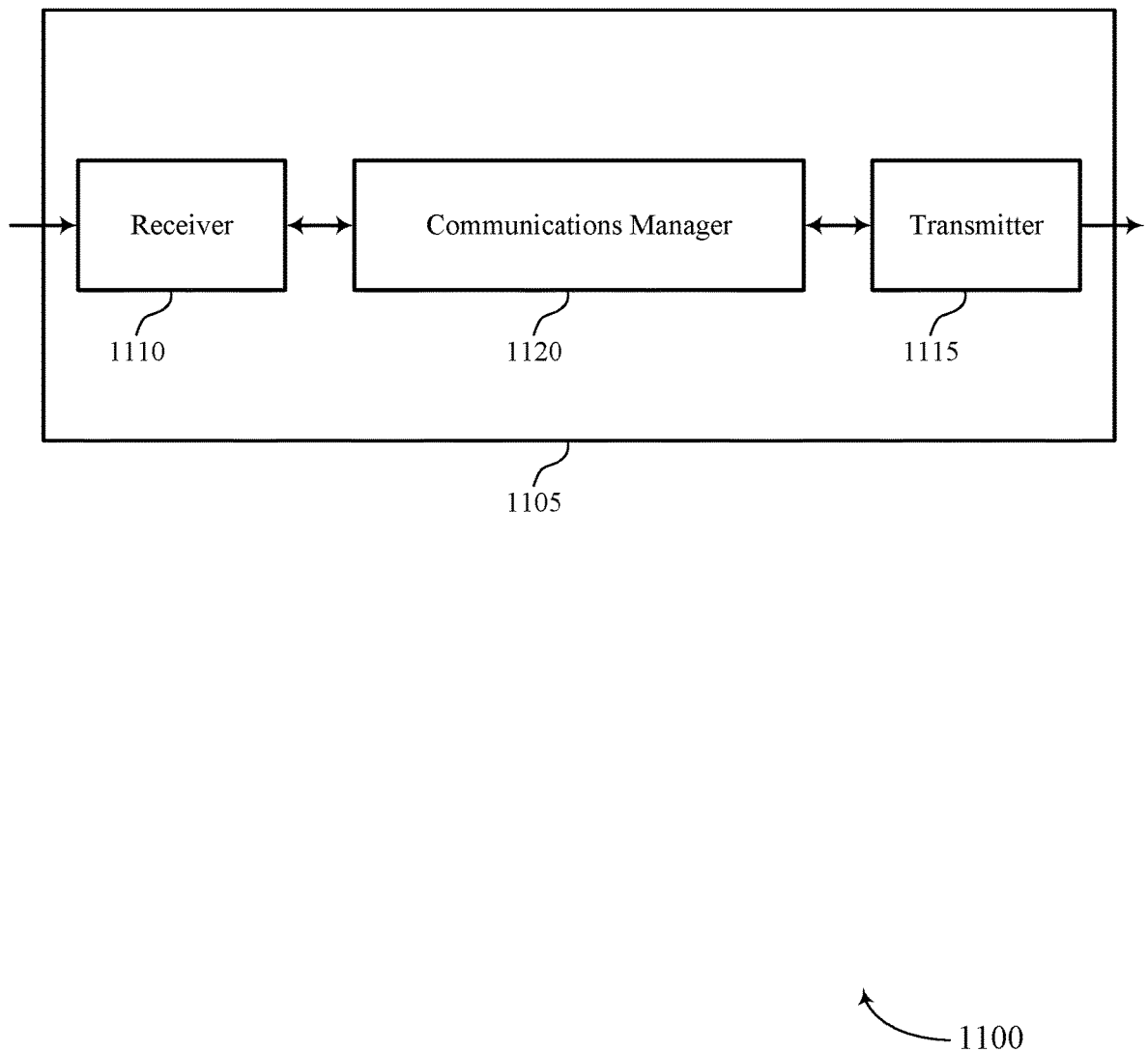
FIGS. 11 and 12 show block diagrams of devices that support network coding handover between network coding devices in accordance with one or more aspects of the present disclosure.

FIG. 11 shows a block diagram 1100 of a device 1105 that supports network coding handover between network coding devices in accordance with one or more aspects of the present disclosure. The device 1105 may be an example of aspects of a network entity 105 (e.g., a network coding device) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of network coding handover between network coding devices as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first network coding device in accordance with examples as disclosed herein. For example, the communications manager 1120 may be configured as or otherwise support a means for receiving a first request for the first network coding device to retransmit a packet originally transmitted by a UE. The communications manager 1120 may be configured as or otherwise support a means for transmitting an accept message to the UE indicating that the first network coding device is to retransmit the packet. The communications manager 1120 may be configured as or otherwise support a means for determining to hand over retransmission of the packet. The communications manager 1120 may be configured as or otherwise support a means for transmitting a negative acknowledgment to the UE triggering handover of the retransmission of the packet from the first network coding device to a second network coding device based on the determining.

Additionally, or alternatively, the communications manager 1120 may support wireless communication at a first network coding device in accordance with examples as disclosed herein. For example, the communications manager 1120 may be configured as or otherwise support a means for receiving a first request for the first network coding device to retransmit a packet originally transmitted by a UE. The communications manager 1120 may be configured as or otherwise support a means for transmitting an accept message to the UE indicating that the first network coding device is to retransmit the packet. The communications manager 1120 may be configured as or otherwise support a means for determining to hand over retransmission of the packet. The communications manager 1120 may be configured as or otherwise support a means for transmitting a second request for a second network coding device to retransmit the packet based on the determining.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources. Because the device 1105 may hand over retransmission of a packet to another network coding device, overhead associated with retransmissions may be reduced while the likelihood that the packet may be successfully received by a wireless device may increase. As such, processing and power consumption associated with retransmissions of the packet may be reduced and less resources may be used the retransmissions of the packet.

Figure 12:
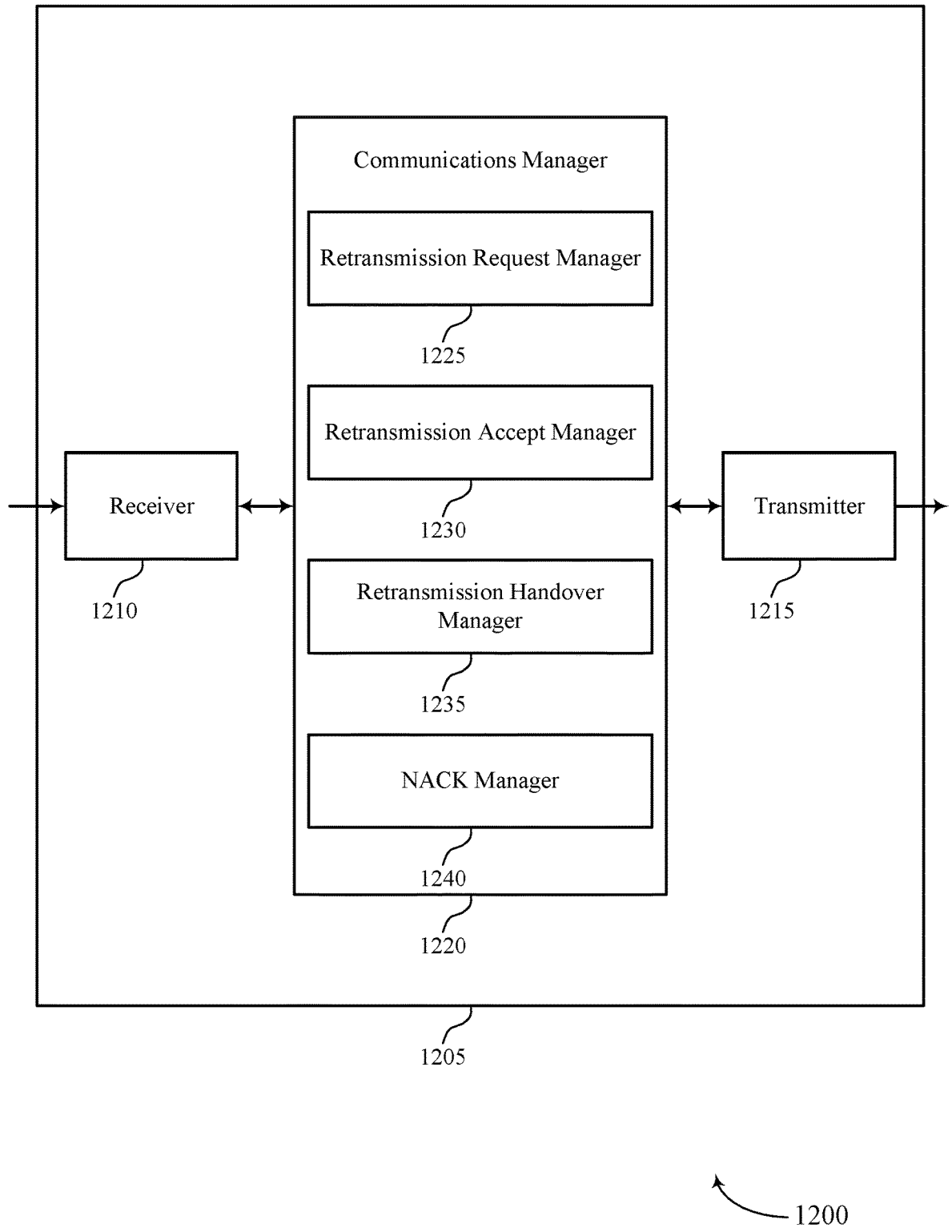

FIG. 12 shows a block diagram 1200 of a device 1205 that supports network coding handover between network coding devices in accordance with one or more aspects of the present disclosure. The device 1205 may be an example of aspects of a device 1105 or a network entity 105 (e.g., a network coding device) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of network coding handover between network coding devices as described herein. For example, the communications manager 1220 may include a retransmission request manager 1225, a retransmission accept manager 1230, a retransmission handover manager 1235, a NACK manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a first network coding device in accordance with examples as disclosed herein. The retransmission request manager 1225 may be configured as or otherwise support a means for receiving a first request for the first network coding device to retransmit a packet originally transmitted by a UE. The retransmission accept manager 1230 may be configured as or otherwise support a means for transmitting an accept message to the UE indicating that the first network coding device is to retransmit the packet. The retransmission handover manager 1235 may be configured as or otherwise support a means for determining to hand over retransmission of the packet. The NACK manager 1240 may be configured as or otherwise support a means for transmitting a negative acknowledgment to the UE triggering handover of the retransmission of the packet from the first network coding device to a second network coding device based on the determining.

Additionally, or alternatively, the communications manager 1220 may support wireless communication at a first network coding device in accordance with examples as disclosed herein. The retransmission request manager 1225 may be configured as or otherwise support a means for receiving a first request for the first network coding device to retransmit a packet originally transmitted by a UE. The retransmission accept manager 1230 may be configured as or otherwise support a means for transmitting an accept message to the UE indicating that the first network coding device is to retransmit the packet. The retransmission handover manager 1235 may be configured as or otherwise support a means for determining to hand over retransmission of the packet. The retransmission request manager 1225 may be configured as or otherwise support a means for transmitting a second request for a second network coding device to retransmit the packet based on the determining.

Figure 13:
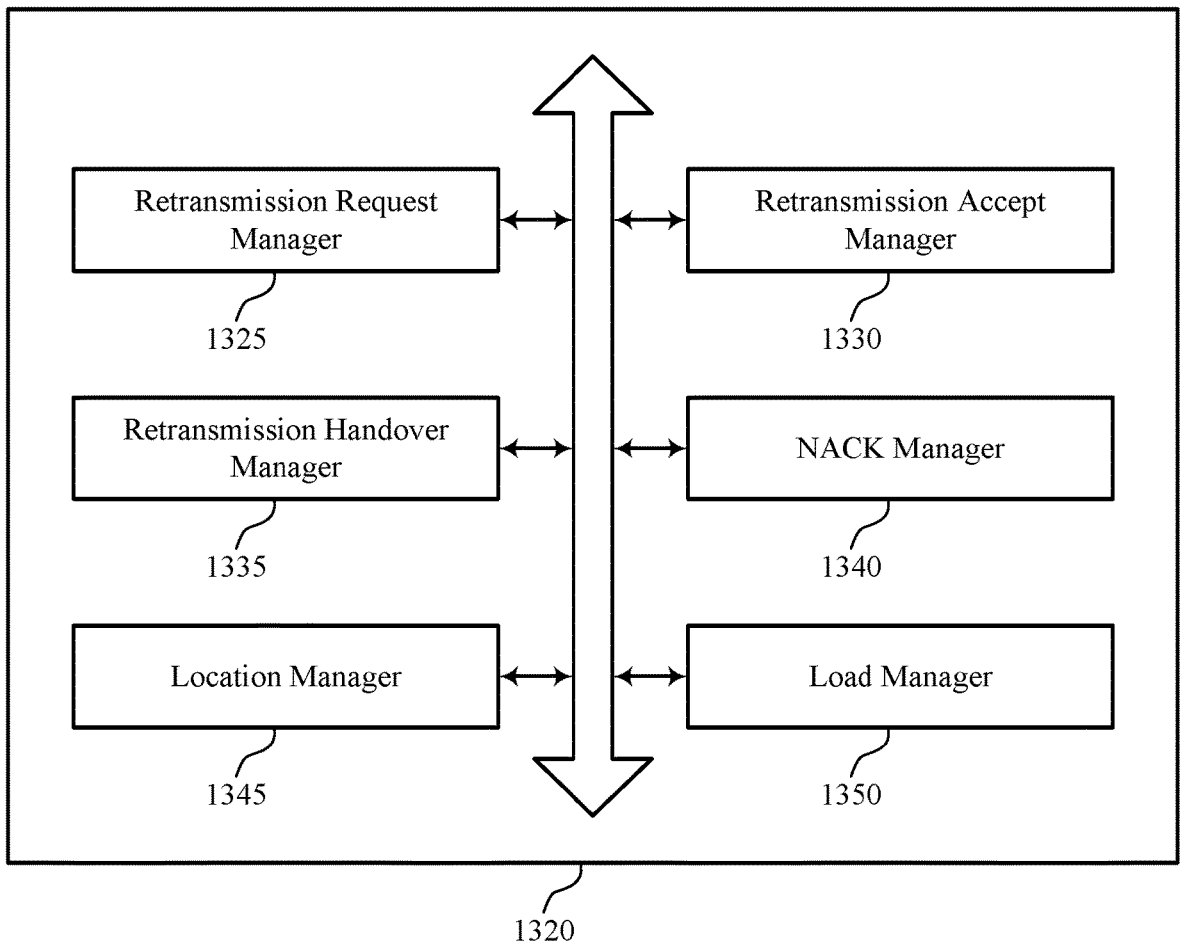
FIG. 13 shows a block diagram of a communications manager that supports network coding handover between network coding devices in accordance with one or more aspects of the present disclosure.

FIG. 13 shows a block diagram 1300 of a communications manager 1320 that supports network coding handover between network coding devices in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of network coding handover between network coding devices as described herein. For example, the communications manager 1320 may include a retransmission request manager 1325, a retransmission accept manager 1330, a retransmission handover manager 1335, a NACK manager 1340, a location manager 1345, a load manager 1350, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a first network coding device in accordance with examples as disclosed herein. The retransmission request manager 1325 may be configured as or otherwise support a means for receiving a first request for the first network coding device to retransmit a packet originally transmitted by a UE. The retransmission accept manager 1330 may be configured as or otherwise support a means for transmitting an accept message to the UE indicating that the first network coding device is to retransmit the packet. The retransmission handover manager 1335 may be configured as or otherwise support a means for determining to hand over retransmission of the packet. The NACK manager 1340 may be configured as or otherwise support a means for transmitting a negative acknowledgment to the UE triggering handover of the retransmission of the packet from the first network coding device to a second network coding device based on the determining.

In some examples, the retransmission request manager 1325 may be configured as or otherwise support a means for receiving a second request for the first network coding device to retransmit the packet originally transmitted by the UE. In some examples, the retransmission request manager 1325 may be configured as or otherwise support a means for ignoring the second request based on determining to hand over retransmission of the packet.

In some examples, the location manager 1345 may be configured as or otherwise support a means for determining that the first network coding device is closest to the UE out of a set of multiple network coding devices, where transmitting the accept message to the UE is based on determining that the first network coding device is closest to the UE.

In some examples, the location manager 1345 may be configured as or otherwise support a means for receiving an indication of a location of each network coding device of the set of multiple network coding devices, where determining that the first network coding device is closest to the UE is based on receiving the indication of the location of each network coding device of the set of multiple network coding devices.

In some examples, the indication of the location of each network coding device is received in a sidelink control information message, a medium access control control element, or a radio resource control message.

Additionally, or alternatively, the communications manager 1320 may support wireless communication at a first network coding device in accordance with examples as disclosed herein. In some examples, the retransmission request manager 1325 may be configured as or otherwise support a means for receiving a first request for the first network coding device to retransmit a packet originally transmitted by a UE. In some examples, the retransmission accept manager 1330 may be configured as or otherwise support a means for transmitting an accept message to the UE indicating that the first network coding device is to retransmit the packet. In some examples, the retransmission handover manager 1335 may be configured as or otherwise support a means for determining to hand over retransmission of the packet. In some examples, the retransmission request manager 1325 may be configured as or otherwise support a means for transmitting a second request for a second network coding device to retransmit the packet based on the determining.

In some examples, the retransmission request manager 1325 may be configured as or otherwise support a means for transmitting, in the second request, an indication of the second network coding device to retransmit the packet based on a load of the second network coding device.

In some examples, the load manager 1350 may be configured as or otherwise support a means for receiving, from the second network coding device, an indication of the load of the second network coding device.

In some examples, the load manager 1350 may be configured as or otherwise support a means for monitoring transmissions from the second network coding device to determine a quantity and size of transmissions from the second network coding device. In some examples, the load manager 1350 may be configured as or otherwise support a means for determining the load of the second network coding device based on the monitoring.

In some examples, the retransmission handover manager 1335 may be configured as or otherwise support a means for determining that the second network coding device transmitted another accept message to the UE to retransmit the packet. In some examples, the retransmission handover manager 1335 may be configured as or otherwise support a means for determining that the second network coding device has the packet stored based on the second network coding device transmitting the other accept message to the UE to retransmit the packet.

In some examples, the retransmission request manager 1325 may be configured as or otherwise support a means for transmitting, in the second request, an indication of the second network coding device to retransmit the packet based on the second network coding device being closest to the UE out of a set of multiple network coding devices.

In some examples, the location manager 1345 may be configured as or otherwise support a means for receiving an indication of a location of each network coding device of the set of multiple network coding devices. In some examples, the location manager 1345 may be configured as or otherwise support a means for determining that the second network coding device is closest to the UE out of the set of multiple network coding devices based on receiving the indication of the location of each network coding device of the set of multiple network coding devices.

In some examples, the indication of the location of each network coding device is received in a sidelink control information message, a medium access control control element, or a radio resource control message.

In some examples, the retransmission request manager 1325 may be configured as or otherwise support a means for transmitting, in the second request, an indication of the second network coding device to retransmit the packet based on determining that the second network coding device has the packet stored in a buffer.

In some examples, the retransmission request manager 1325 may be configured as or otherwise support a means for transmitting, in the second request, an indication of the second network coding device to retransmit the packet. In some examples, the retransmission handover manager 1335 may be configured as or otherwise support a means for transmitting the packet to the second network coding device based on determining that the packet is missing from a buffer at the second network coding device.

In some examples, the retransmission request manager 1325 may be configured as or otherwise support a means for transmitting, in the second request, an indication of a group of network coding devices, each network coding device in the group being a candidate for retransmitting the packet.

In some examples, to support transmitting the second request for retransmission of the packet, the retransmission request manager 1325 may be configured as or otherwise support a means for retransmitting the packet originally transmitted by the UE with the second request for retransmission of the packet.

In some examples, to support transmitting the second request for retransmission of the packet, the retransmission request manager 1325 may be configured as or otherwise support a means for transmitting a control message with the second request for the second network coding device to retransmit the packet.

In some examples, the control message includes a sidelink control information message, a medium access control control element, or a radio resource control message.

Figure 14:
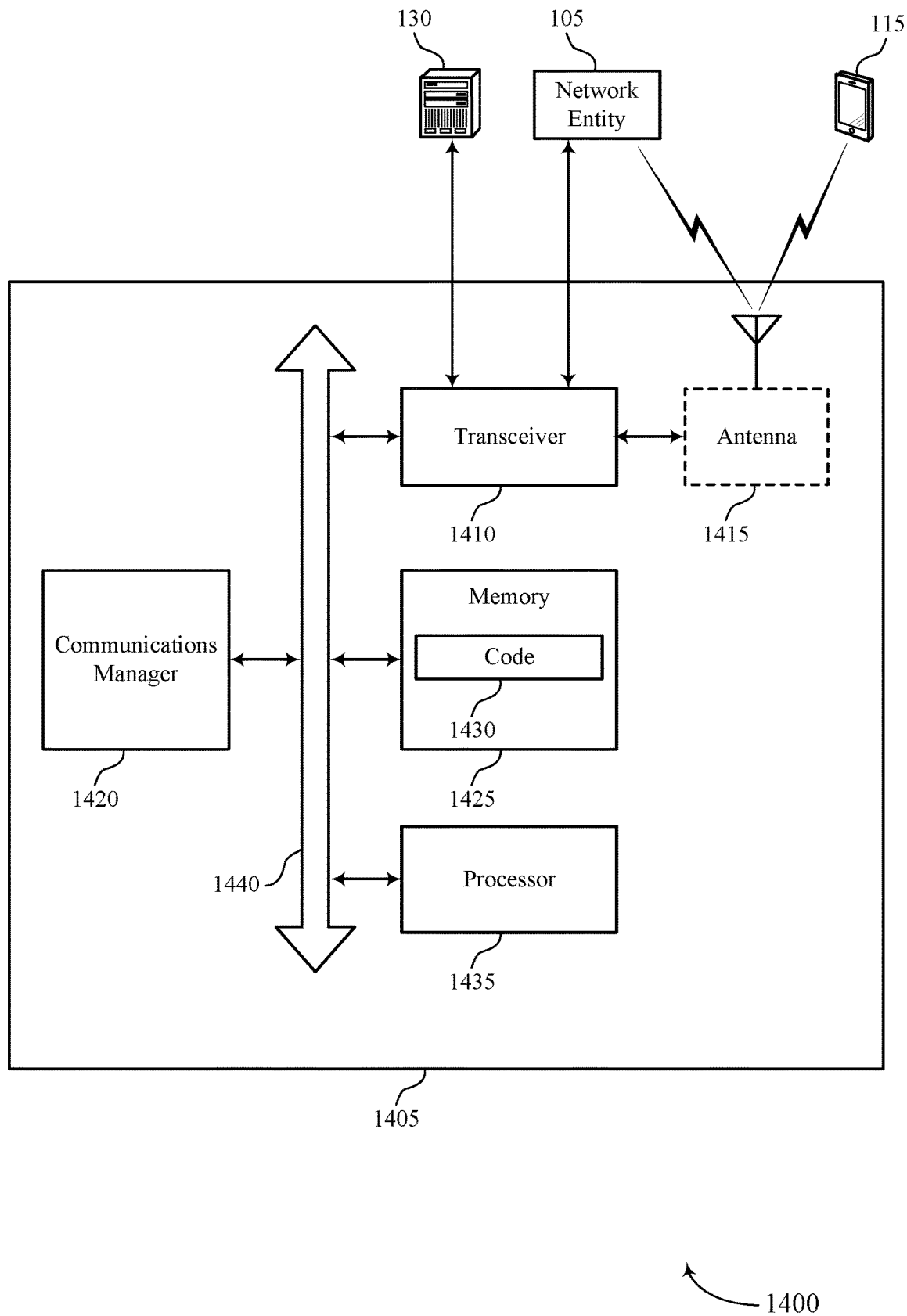
FIG. 14 shows a diagram of a system including a device that supports network coding handover between network coding devices in accordance with one or more aspects of the present disclosure.

FIG. 14 shows a diagram of a system 1400 including a device 1405 that supports network coding handover between network coding devices in accordance with one or more aspects of the present disclosure. The device 1405 may be an example of or include the components of a device 1105, a device 1205, or a network entity 105 (e.g., a network coding device) as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting network coding handover between network coding devices). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a first network coding device in accordance with examples as disclosed herein. For example, the communications manager 1420 may be configured as or otherwise support a means for receiving a first request for the first network coding device to retransmit a packet originally transmitted by a UE. The communications manager 1420 may be configured as or otherwise support a means for transmitting an accept message to the UE indicating that the first network coding device is to retransmit the packet. The communications manager 1420 may be configured as or otherwise support a means for determining to hand over retransmission of the packet. The communications manager 1420 may be configured as or otherwise support a means for transmitting a negative acknowledgment to the UE triggering handover of the retransmission of the packet from the first network coding device to a second network coding device based on the determining.

Additionally, or alternatively, the communications manager 1420 may support wireless communication at a first network coding device in accordance with examples as disclosed herein. For example, the communications manager 1420 may be configured as or otherwise support a means for receiving a first request for the first network coding device to retransmit a packet originally transmitted by a UE. The communications manager 1420 may be configured as or otherwise support a means for transmitting an accept message to the UE indicating that the first network coding device is to retransmit the packet. The communications manager 1420 may be configured as or otherwise support a means for determining to hand over retransmission of the packet. The communications manager 1420 may be configured as or otherwise support a means for transmitting a second request for a second network coding device to retransmit the packet based on the determining.

By including or configuring the communications manager 1420 in accordance with examples as described herein, the device 1405 may support techniques for reduced processing, reduced power consumption, and more efficient utilization of communication resources. Because the device 1405 may hand over retransmission of a packet to another network coding device, overhead associated with retransmissions may be reduced while the likelihood that the packet may be successfully received by a wireless device may increase. As such, processing and power consumption associated with retransmissions of the packet may be reduced and less resources may be used the retransmissions of the packet.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of network coding handover between network coding devices as described herein, or the processor 1435 and the memory 1425 may be otherwise configured to perform or support such operations.

Figure 15:
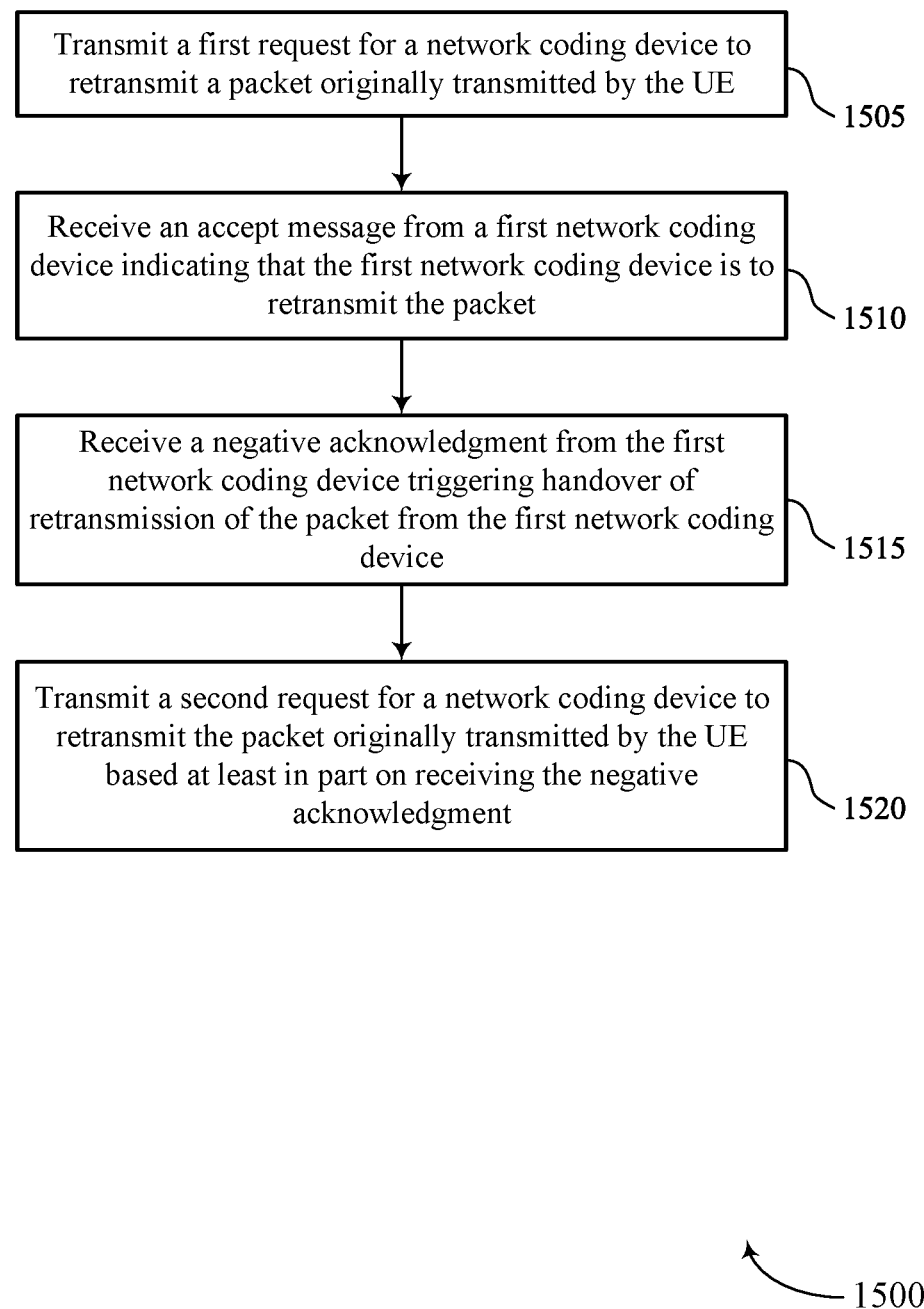
FIGS. 15 through 17 show flowcharts illustrating methods that support network coding handover between network coding devices in accordance with one or more aspects of the present disclosure.

FIG. 15 shows a flowchart illustrating a method 1500 that supports network coding handover between network coding devices in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method includes transmitting a first request for a network coding device to retransmit a packet originally transmitted by the UE. The operations of 1505 may be performed in accordance with examples as disclosed herein. In some examples, aspects of the operations of 1505 may be performed by a retransmission request manager 925 as described with reference to FIG. 9.

At 1510, the method includes receiving an accept message from a first network coding device indicating that the first network coding device is to retransmit the packet. The operations of 1510 may be performed in accordance with examples as disclosed herein. In some examples, aspects of the operations of 1510 may be performed by a retransmission accept manager 930 as described with reference to FIG. 9.

At 1515, the method includes receiving a negative acknowledgment from the first network coding device triggering handover of retransmission of the packet from the first network coding device. The operations of 1515 may be performed in accordance with examples as disclosed herein. In some examples, aspects of the operations of 1515 may be performed by a NACK manager 935 as described with reference to FIG. 9.

At 1520, the method includes transmitting a second request for a network coding device to retransmit the packet originally transmitted by the UE based on receiving the negative acknowledgment. The operations of 1520 may be performed in accordance with examples as disclosed herein. In some examples, aspects of the operations of 1520 may be performed by a retransmission request manager 925 as described with reference to FIG. 9.

Figure 16:
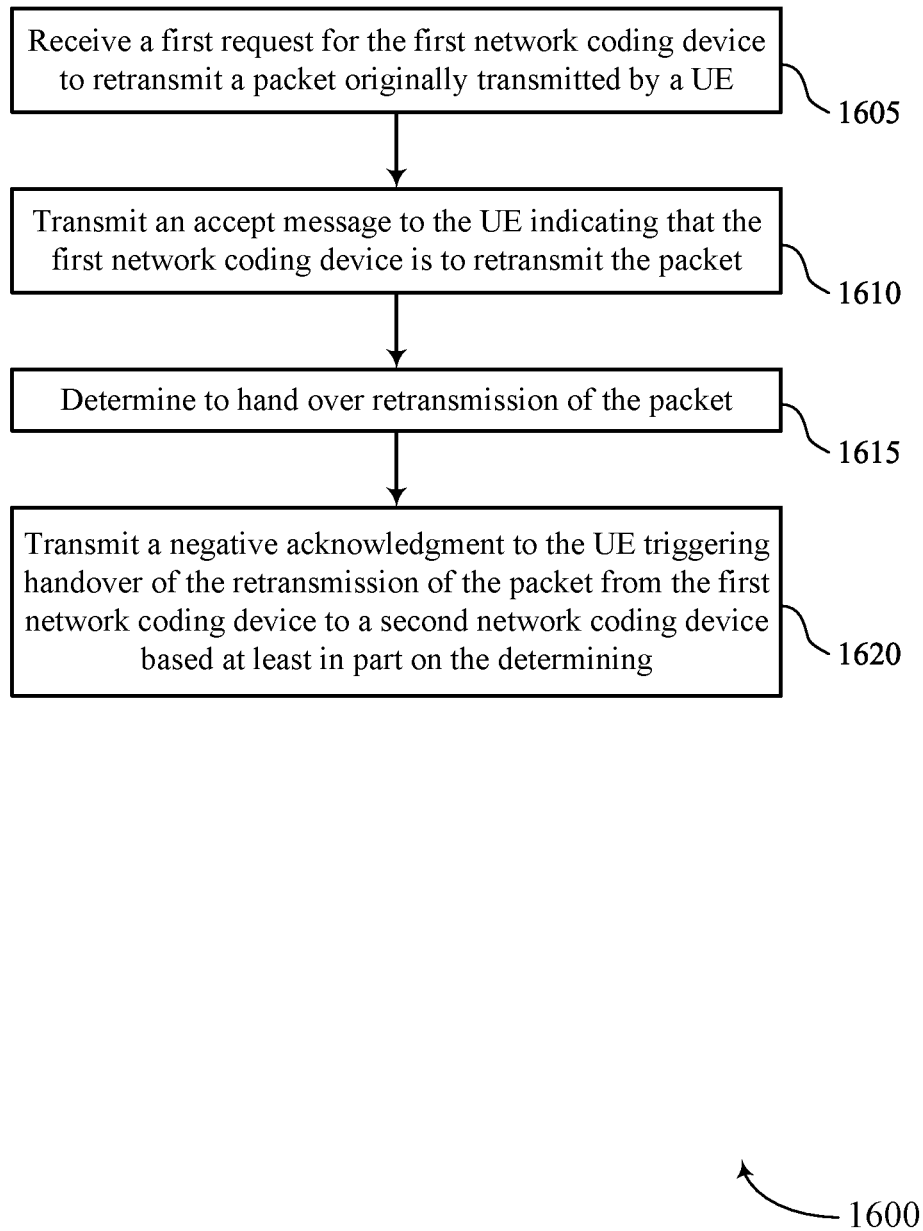

FIG. 16 shows a flowchart illustrating a method 1600 that supports network coding handover between network coding devices in accordance with one or more aspects of the present disclosure. The operations of the method 1600 may be implemented by a UE or a network entity or its components as described herein. For example, the operations of the method 1600 may be performed by a UE 115 as described with reference to FIGS. 1 through 10 or a network entity as described with reference to FIGS. 1 through 6 and 11 through 14. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1605, the method includes receiving a first request for the first network coding device to retransmit a packet originally transmitted by a UE. The operations of 1605 may be performed in accordance with examples as disclosed herein. In some examples, aspects of the operations of 1605 may be performed by a retransmission request manager 925 or a retransmission request manager 1325 as described with reference to FIGS. 9 and 13.

At 1610, the method includes transmitting an accept message to the UE indicating that the first network coding device is to retransmit the packet. The operations of 1610 may be performed in accordance with examples as disclosed herein. In some examples, aspects of the operations of 1610 may be performed by a retransmission accept manager 930 or a retransmission accept manager 1330 as described with reference to FIGS. 9 and 13.

At 1615, the method includes determining to hand over retransmission of the packet. The operations of 1615 may be performed in accordance with examples as disclosed herein. In some examples, aspects of the operations of 1615 may be performed by a retransmission handover manager 940 or a retransmission handover manager 1335 as described with reference to FIGS. 9 and 13.

At 1620, the method includes transmitting a negative acknowledgment to the UE triggering handover of the retransmission of the packet from the first network coding device to a second network coding device based on the determining. The operations of 1620 may be performed in accordance with examples as disclosed herein. In some examples, aspects of the operations of 1620 may be performed by a NACK manager 935 or a NACK manager 1340 as described with reference to FIGS. 9 and 13.

Figure 17:
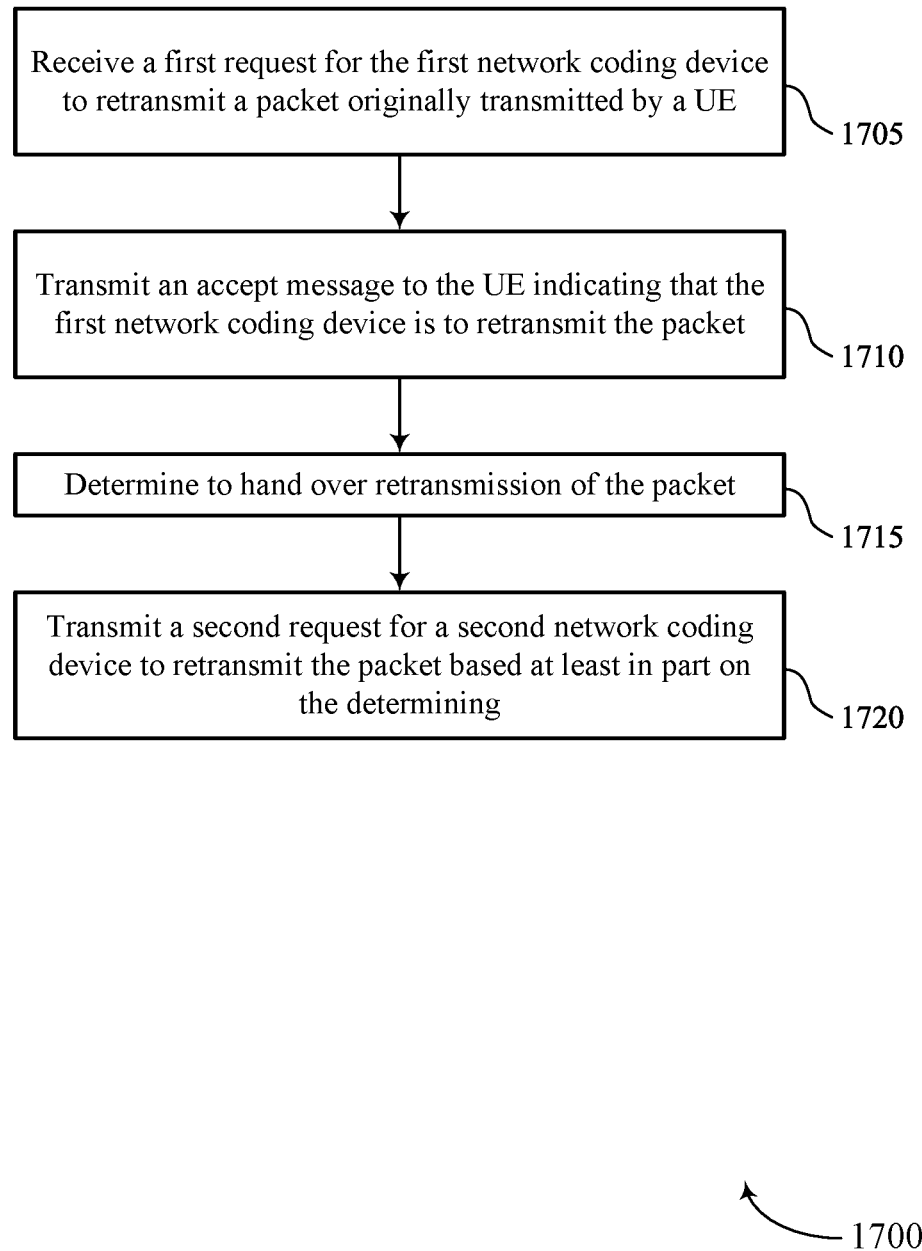

FIG. 17 shows a flowchart illustrating a method 1700 that supports network coding handover between network coding devices in accordance with one or more aspects of the present disclosure. The operations of the method 1700 may be implemented by a UE or a network entity or its components as described herein. For example, the operations of the method 1700 may be performed by a UE 115 as described with reference to FIGS. 1 through 10 or a network entity as described with reference to FIGS. 1 through 6 and 11 through 14. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1705, the method includes receiving a first request for the first network coding device to retransmit a packet originally transmitted by a UE. The operations of 1705 may be performed in accordance with examples as disclosed herein. In some examples, aspects of the operations of 1705 may be performed by a retransmission request manager 925 or a retransmission request manager 1325 as described with reference to FIGS. 9 and 13.

At 1710, the method includes transmitting an accept message to the UE indicating that the first network coding device is to retransmit the packet. The operations of 1710 may be performed in accordance with examples as disclosed herein. In some examples, aspects of the operations of 1710 may be performed by a retransmission accept manager 930 or a retransmission accept manager 1330 as described with reference to FIGS. 9 and 13.

At 1715, the method includes determining to hand over retransmission of the packet. The operations of 1715 may be performed in accordance with examples as disclosed herein. In some examples, aspects of the operations of 1715 may be performed by a retransmission handover manager 940 or a retransmission handover manager 1335 as described with reference to FIGS. 9 and 13.

At 1720, the method includes transmitting a second request for a second network coding device to retransmit the packet based on the determining. The operations of 1720 may be performed in accordance with examples as disclosed herein. In some examples, aspects of the operations of 1720 may be performed by a retransmission request manager 925 or a retransmission request manager 1325 as described with reference to FIGS. 9 and 13.

The following provides an overview of aspects of the present disclosure:

Aspect 1: A method for wireless communication at a UE, comprising: transmitting a first request for a network coding device to retransmit a packet originally transmitted by the UE; receiving an accept message from a first network coding device indicating that the first network coding device is to retransmit the packet; receiving a negative acknowledgment from the first network coding device triggering handover of retransmission of the packet from the first network coding device; and transmitting a second request for a network coding device to retransmit the packet originally transmitted by the UE based at least in part on receiving the negative acknowledgment.

Aspect 2: The method of aspect 1, further comprising: transmitting the packet to one or more UEs; and determining that at least one UE of the one or more UEs failed to receive the packet from the UE, wherein transmitting the first request for the network coding device to retransmit the packet is based at least in part on the determining.

Aspect 3: The method of aspects 1 or 2, further comprising: transmitting, in the second request, an indication of a second network coding device to retransmit the packet originally transmitted by the UE.

Aspect 4: The method of any of aspects 1 through 3, further comprising: transmitting, in the second request, an indication of at least one network coding device to avoid retransmitting the packet originally transmitted by the UE.

Aspect 5: The method of any of aspects 1 through 4, further comprising: storing the packet in a buffer at the UE, wherein transmitting the second request for the network coding device to retransmit the packet is based at least in part on storing the packet in the buffer at the UE.

Aspect 6: The method of any of aspects 1 through 5, wherein the first request for the network coding device to retransmit the packet is included in a first retransmission of the packet from the UE, and the second request for the network coding device to retransmit the packet is included in a second retransmission of the packet from the UE.

Aspect 7: A method for wireless communication at a first network coding device, comprising: receiving a first request for the first network coding device to retransmit a packet originally transmitted by a UE; transmitting an accept message to the UE indicating that the first network coding device is to retransmit the packet; determining to hand over retransmission of the packet; and transmitting a negative acknowledgment to the UE triggering handover of the retransmission of the packet from the first network coding device to a second network coding device based at least in part on the determining.

Aspect 8: The method of aspect 7, further comprising: receiving a second request for the first network coding device to retransmit the packet originally transmitted by the UE; and ignoring the second request based at least in part on determining to hand over retransmission of the packet.

Aspect 9: The method of aspects 7 or 8, further comprising: determining that the first network coding device is closest to the UE out of a plurality of network coding devices, wherein transmitting the accept message to the UE is based at least in part on determining that the first network coding device is closest to the UE.

Aspect 10: The method of aspect 9, further comprising: receiving an indication of a location of each network coding device of the plurality of network coding devices, wherein determining that the first network coding device is closest to the UE is based at least in part on receiving the indication of the location of each network coding device of the plurality of network coding devices.

Aspect 11: The method of aspect 10, wherein the indication of the location of each network coding device is received in a sidelink control information message, a medium access control control element, or a radio resource control message.

Aspect 12: A method for wireless communication at a first network coding device, comprising: receiving a first request for the first network coding device to retransmit a packet originally transmitted by a UE; transmitting an accept message to the UE indicating that the first network coding device is to retransmit the packet; determining to hand over retransmission of the packet; and transmitting a second request for a second network coding device to retransmit the packet based at least in part on the determining.

Aspect 13: The method of aspect 12, further comprising: transmitting, in the second request, an indication of the second network coding device to retransmit the packet based at least in part on a load of the second network coding device.

Aspect 14: The method of aspect 13, further comprising: receiving, from the second network coding device, an indication of the load of the second network coding device.

Aspect 15: The method of aspect 13, further comprising: monitoring transmissions from the second network coding device to determine a quantity and size of transmissions from the second network coding device; and determining the load of the second network coding device based at least in part on the monitoring.

Aspect 16: The method of any of aspects 12 through 15, further comprising: determining that the second network coding device transmitted another accept message to the UE to retransmit the packet; and determining that the second network coding device has the packet stored based at least in part on the second network coding device transmitting the other accept message to the UE to retransmit the packet.

Aspect 17: The method of any of aspects 12 through 16, further comprising: transmitting, in the second request, an indication of the second network coding device to retransmit the packet based at least in part on the second network coding device being closest to the UE out of a plurality of network coding devices.

Aspect 18: The method of aspect 17, further comprising: receiving an indication of a location of each network coding device of the plurality of network coding devices; and determining that the second network coding device is closest to the UE out of the plurality of network coding devices based at least in part on receiving the indication of the location of each network coding device of the plurality of network coding devices.

Aspect 19: The method of aspect 18, wherein the indication of the location of each network coding device is received in a sidelink control information message, a medium access control control element, or a radio resource control message.

Aspect 20: The method of any of aspects 12 through 19, further comprising: transmitting, in the second request, an indication of the second network coding device to retransmit the packet based at least in part on determining that the second network coding device has the packet stored in a buffer.

Aspect 21: The method of any of aspects 12 through 19, further comprising: transmitting, in the second request, an indication of the second network coding device to retransmit the packet; and transmitting the packet to the second network coding device based at least in part on determining that the packet is missing from a buffer at the second network coding device.

Aspect 22: The method of any of aspects 12 through 21, further comprising: transmitting, in the second request, an indication of a group of network coding devices, each network coding device in the group being a candidate for retransmitting the packet.

Aspect 23: The method of any of aspects 12 through 22, wherein transmitting the second request for retransmission of the packet comprises: retransmitting the packet originally transmitted by the UE with the second request for retransmission of the packet.

Aspect 24: The method of any of aspects 12 through 23, wherein transmitting the second request for retransmission of the packet comprises: transmitting a control message with the second request for the second network coding device to retransmit the packet.

Aspect 25: The method of aspect 24, wherein the control message comprises a sidelink control information message, a medium access control control element, or a radio resource control message.

Aspect 26: An apparatus for wireless communication at a UE, comprising a processor; memory coupled with the processor; and instructions stored in the memory and executable by the processor to cause the apparatus to perform a method of any of aspects 1 through 6.

Aspect 27: An apparatus for wireless communication at a UE, comprising at least one means for performing a method of any of aspects 1 through 6.

Aspect 28: A non-transitory computer-readable medium storing code for wireless communication at a UE, the code comprising instructions executable by a processor to perform a method of any of aspects 1 through 6.

Aspect 29: An apparatus for wireless communication at a network coding device, comprising a processor; memory coupled with the processor; and instructions stored in the memory and executable by the processor to cause the apparatus to perform a method of any of aspects 7 through 11.

Aspect 30: An apparatus for wireless communication at a network coding device, comprising at least one means for performing a method of any of aspects 7 through 11.

Aspect 31: A non-transitory computer-readable medium storing code for wireless communication at a network coding device, the code comprising instructions executable by a processor to perform a method of any of aspects 7 through 11.

Aspect 32: An apparatus for wireless communication at a first network coding device, comprising a processor; memory coupled with the processor; and instructions stored in the memory and executable by the processor to cause the apparatus to perform a method of any of aspects 12 through 25.

Aspect 33: An apparatus for wireless communication at a first network coding device, comprising at least one means for performing a method of any of aspects 12 through 25.

Aspect 34: A non-transitory computer-readable medium storing code for wireless communication at a first network coding device, the code comprising instructions executable by a processor to perform a method of any of aspects 12 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An user equipment (UE) for wireless communication, comprising:
    one or more memories storing processor-executable code; and
    one or more processors coupled with the one or more memories and operable to execute the code to cause the UE to:
        transmit a first request for a network coding device to transmit a network coded packet that is based at least in part on a first packet originally transmitted by the UE and one or more second packets originally transmitted by one or more other UEs;
        receive, prior to transmission of the network coded packet, an accept message from a first network coding device indicating that the first network coding device accepts the first request and is to transmit the network coded packet based at least in part on transmitting the first request;
        receive a negative acknowledgment from the first network coding device triggering handover of transmission of the network coded packet from the first network coding device; and
        transmit a second request for a network coding device to transmit a second network coded packet based at least in part on receiving the negative acknowledgment.

2. The UE of claim 1, wherein the one or more processors are further operable to execute the code to cause the UE to:
    transmit the first packet to one or more UEs; and
    determine that at least one UE of the one or more UEs failed to receive the first packet from the UE, wherein transmitting the first request for the network coding device to transmit the network coded packet is based at least in part on the determining.

3. The UE of claim 1, wherein the one or more processors are further operable to execute the code to cause the UE to:
    transmit, in the second request, an indication of a second network coding device to transmit the second network coded packet.

4. The UE of claim 1, wherein the one or more processors are further operable to execute the code to cause the UE to:
    transmit, in the second request, an indication of at least one network coding device to avoid transmitting the second network coded packet.

5. The UE of claim 1, wherein the one or more processors are further operable to execute the code to cause the UE to:
    store the first packet in a buffer at the UE, wherein transmitting the second request for the network coding device to transmit the second network coded packet is based at least in part on storing the first packet in the buffer at the UE.

6. The UE of claim 1, wherein the first request for the network coding device to transmit the network coded packet is included in a first retransmission of the first packet from the UE, and the second request for the network coding device to transmit the second network coded packet is included in a second retransmission of the first packet from the UE.

7. A method for wireless communication at a user equipment (UE), comprising:
    transmitting a first request for a network coding device to transmit a network coded packet that is based at least in part on a first packet originally transmitted by the UE and one or more second packets originally transmitted by one or more other UEs;
    receiving, prior to transmission of the network coded packet, an accept message from a first network coding device indicating that the first network coding device accepts the first request and is to transmit the network coded packet based at least in part on transmitting the first request;
    receiving a negative acknowledgment from the first network coding device triggering handover of transmission of the network coded packet from the first network coding device; and
    transmitting a second request for a network coding device to transmit a second network coded packet based at least in part on receiving the negative acknowledgment.

8. The method of claim 7, further comprising:
    transmitting the first packet to one or more UEs; and
    determining that at least one UE of the one or more UEs failed to receive the first packet from the UE, wherein transmitting the first request for the network coding device to transmit the network coded packet is based at least in part on the determining.

9. The method of claim 7, further comprising:
transmitting, in the second request, an indication of a second network coding device to transmit the second network coded packet.

10. The method of claim 7, further comprising:
transmitting, in the second request, an indication of at least one network coding device to avoid transmitting the second network coded packet.

11. The method of claim 7, further comprising:
storing the first packet in a buffer at the UE, wherein transmitting the second request for the network coding device to transmit the second network coded packet is based at least in part on storing the first packet in the buffer at the UE.

12. The method of claim 7, wherein the first request for the network coding device to transmit the network coded packet is included in a first retransmission of the first packet from the UE, and the second request for the network coding device to transmit the second network coded packet is included in a second retransmission of the first packet from the UE.

13. A non-transitory computer-readable medium storing code for wireless communication, the code comprising instructions executable by one or more processors to:
transmit a first request for a network coding device to transmit a network coded packet that is based at least in part on a first packet originally transmitted by a UE and one or more second packets originally transmitted by one or more other UEs;
receive, prior to transmission of the network coded packet, an accept message from a first network coding device indicating that the first network coding device accepts the first request and is to transmit the network coded packet based at least in part on transmitting the first request;
receive a negative acknowledgment from the first network coding device triggering handover of transmission of the network coded packet from the first network coding device; and
transmit a second request for a network coding device to transmit a second network coded packet based at least in part on receiving the negative acknowledgment.

14. The non-transitory computer-readable medium of claim 13, wherein the instructions are further executable by the one or more processors to:
transmit the first packet to one or more UEs; and
determine that at least one UE of the one or more UEs failed to receive the first packet from the UE, wherein transmitting the first request for the network coding device to transmit the network coded packet is based at least in part on the determining.

15. The non-transitory computer-readable medium of claim 13, wherein the instructions are further executable by the one or more processors to:
transmit, in the second request, an indication of a second network coding device to transmit the second network coded packet.

16. The non-transitory computer-readable medium of claim 13, wherein the instructions are further executable by the one or more processors to:
transmit, in the second request, an indication of at least one network coding device to avoid transmitting the second network coded packet.

17. The non-transitory computer-readable medium of claim 13, wherein the instructions are further executable by the one or more processors to:
store the first packet in a buffer at the UE, wherein transmitting the second request for the network coding device to transmit the second network coded packet is based at least in part on storing the first packet in the buffer at the UE.

18. The non-transitory computer-readable medium of claim 13, wherein the first request for the network coding device to transmit the network coded packet is included in a first retransmission of the first packet from the UE, and the second request for the network coding device to transmit the second network coded packet is included in a second retransmission of the first packet from the UE.

19. A user equipment (UE) for wireless communication, comprising:
means for transmitting a first request for a network coding device to transmit a network coded packet that is based at least in part on a first packet originally transmitted by the UE and one or more second packets originally transmitted by one or more other UEs;
means for receiving, prior to transmission of the network coded packet, an accept message from a first network coding device indicating that the first network coding device accepts the first request and is to transmit the network coded packet based at least in part on transmitting the first request;
means for receiving a negative acknowledgment from the first network coding device triggering handover of transmission of the network coded packet from the first network coding device; and
means for transmitting a second request for a network coding device to transmit a second network coded packet based at least in part on receiving the negative acknowledgment.

20. The UE of claim 19, further comprising:
means for transmitting the first packet to one or more UEs; and
means for determining that at least one UE of the one or more UEs failed to receive the first packet from the UE, wherein transmitting the first request for the network coding device to transmit the network coded packet is based at least in part on the determining.

21. The UE of claim 19, further comprising:
means for transmitting, in the second request, an indication of a second network coding device to transmit the second network coded packet.

22. The UE of claim 19, further comprising:
means for transmitting, in the second request, an indication of at least one network coding device to avoid transmitting the second network coded packet.

23. The UE of claim 19, further comprising:
means for storing the first packet in a buffer at the UE, wherein transmitting the second request for the network coding device to transmit the second network coded packet is based at least in part on storing the first packet in the buffer at the UE.

24. The UE of claim 19, wherein the first request for the network coding device to transmit the network coded packet is included in a first retransmission of the first packet from the UE, and the second request for the network coding device to transmit the second network coded packet is included in a second retransmission of the first packet from the UE.

* * * * *